US010803236B2

(12) United States Patent
Ishikawa et al.

(10) Patent No.: US 10,803,236 B2
(45) Date of Patent: Oct. 13, 2020

(54) INFORMATION PROCESSING TO GENERATE SCREEN BASED ON ACQUIRED EDITING INFORMATION

(71) Applicant: SONY CORPORATION, Tokyo (JP)

(72) Inventors: Tsuyoshi Ishikawa, Kanagawa (JP); Takuya Namae, Kanagawa (JP); Daisuke Matsumoto, Kanagawa (JP); Kenji Hisanaga, Tokyo (JP)

(73) Assignee: SONY CORPORATION (JP)

( * ) Notice: Subject to any disclaimer, the term of this patent is extended or adjusted under 35 U.S.C. 154(b) by 26 days.

(21) Appl. No.: 14/907,551

(22) PCT Filed: May 30, 2014

(86) PCT No.: PCT/JP2014/064385
§ 371 (c)(1),
(2) Date: Jan. 25, 2016

(87) PCT Pub. No.: WO2015/015888
PCT Pub. Date: Feb. 5, 2015

(65) Prior Publication Data
US 2016/0188558 A1 Jun. 30, 2016

(30) Foreign Application Priority Data

Jul. 31, 2013 (JP) ................................ 2013-158877

(51) Int. Cl.
*G06F 40/169* (2020.01)
*G06F 3/0483* (2013.01)
(Continued)

(52) U.S. Cl.
CPC .......... *G06F 40/169* (2020.01); *G06F 3/0483* (2013.01); *G06F 3/0488* (2013.01); *G06F 40/103* (2020.01)

(58) Field of Classification Search
CPC ...... G06F 17/24; G06F 17/241; G06F 17/211; G06F 3/0483; G06F 3/0488; G06F 40/169; G06F 40/103; G09G 2380/14
See application file for complete search history.

(56) References Cited

U.S. PATENT DOCUMENTS 6,279,017 B1 * 8/2001 Walker ................... G06F 17/211
715/201
6,339,437 B1 * 1/2002 Nielsen ............... G06F 3/04855
715/787
(Continued)

FOREIGN PATENT DOCUMENTS

JP 2000-112894 A 4/2000
JP 2001-290811 A 10/2001
(Continued)

OTHER PUBLICATIONS

PCMag.com, "Reflowable Text Definition from PC Magazine Encyclopedia," copyright 2013, www.pcmag.com, https://web.archive.org/web/20130614050556/https://www.pcmag.com/encyclopedia/term/58163/reflowable-text, pp. 1-2. (Year: 2013).*

Primary Examiner — Maikhanh Nguyen
(74) Attorney, Agent, or Firm — Chip Law Group

(57) ABSTRACT

Provided is an information processing device including: an information acquiring unit that acquires editing information for electronic book content, and position information indicating an area linked to the editing information in the electronic book content; and a screen generating unit that generates a screen in which the area indicated by the position information has been edited using the editing information.

12 Claims, 26 Drawing Sheets

(51) Int. Cl.
*G06F 3/0488* (2013.01)
*G06F 40/103* (2020.01)

(56) References Cited

U.S. PATENT DOCUMENTS

| | | | | |
|---|---|---|---|---|
| 8,184,132 B2* | 5/2012 | Sakamoto | | G06F 3/011 |
| | | | | 345/156 |
| 8,478,662 B1* | 7/2013 | Snodgrass | | G06Q 30/00 |
| | | | | 705/26.7 |
| 8,706,685 B1* | 4/2014 | Smith | | G06F 16/9558 |
| | | | | 707/608 |
| 9,047,356 B2* | 6/2015 | Puppin | | G06F 16/27 |
| 9,460,089 B1* | 10/2016 | Rathod | | G06F 17/289 |
| 2009/0070376 A1* | 3/2009 | Eom | | G06F 40/169 |
| 2012/0036429 A1* | 2/2012 | Ajima | | G06F 17/241 |
| | | | | 715/259 |
| 2012/0260163 A1* | 10/2012 | Kim | | G06F 3/0485 |
| | | | | 715/273 |
| 2013/0185198 A1* | 7/2013 | Lorch | | G06Q 20/29 |
| | | | | 705/39 |
| 2013/0268847 A1* | 10/2013 | Kim | | G06F 3/0483 |
| | | | | 715/251 |
| 2014/0068428 A1* | 3/2014 | Puppin | | G06F 16/27 |
| | | | | 715/273 |
| 2014/0082466 A1* | 3/2014 | Heo | | G06F 17/24 |
| | | | | 715/202 |
| 2014/0195899 A1* | 7/2014 | Bastide | | G06F 17/24 |
| | | | | 715/256 |

FOREIGN PATENT DOCUMENTS

| | | |
|---|---|---|
| JP | 2011-076566 A | 4/2011 |
| JP | 2012-141967 A | 7/2012 |

* cited by examiner

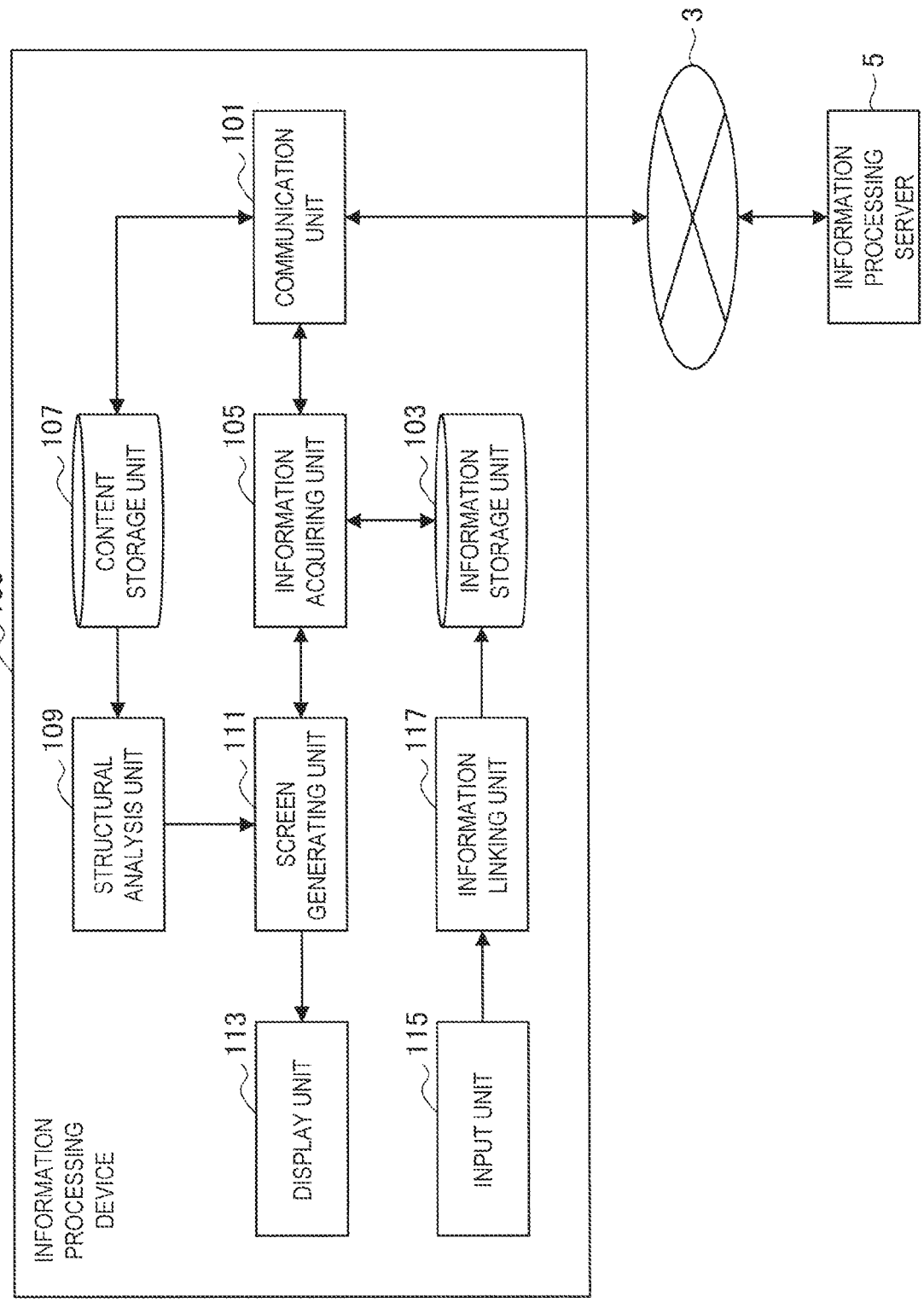

FIG. 3

| INFORMATION CATEGORY | INFORMATION TYPE | CONTENT | POSITION INFORMATION |
|---|---|---|---|
| EDITING INFORMATION | TEXT | GIRLS SITTING NEXT TO EACH OTHER | FROM SECTION 1, PARAGRAPH 22, 86TH LETTER TO SECTION 1, PARAGRAPH 22, 100TH LETTER |
| EDITING INFORMATION | STILL IMAGE | ILLUSTRATION.bmp | AFTER SECTION 1, PARAGRAPH 22, 145TH LETTER |
| ADDITIONAL INFORMATION | TEXT | THIS IS EXACTLY WHAT I EXPECTED! | FROM SECTION 1, PARAGRAPH 24, 22TH LETTER TO SECTION 1, PARAGRAPH 24, 44TH LETTER |
| ... | ... | ... | ... |

FIG. 10

"Ah! here you are!" he exclaimed, looking at Jean Valjean. "I am glad to see you. Well, but how is this? I gave you the candlesticks too, which are of silver like the rest, and for which you can certainly get two hundred francs. Why did you not carry them away with your forks and spoons?"

Jean Valjean opened his eyes wide, and stared at the venerable Bishop with an expression which no human tongue can render any account of.

"Monseigneur," said [the patrol officer] gendarmes, "so what this man said is true, then? We came across him. He was walking like a man who is running away. We stopped him to look into the matter. He had this silver—"

"And he told you," interposed the Bishop with a smile, "that it had been given to him by a kind old fellow of a priest with whom he had passed the night? I see how the matter stands. And you have brought him back here? It is a mistake."

"In that case," replied the brigadier, "we can let him go?"

"Certainly," replied the Bishop.

The gendarmes released Jean Valjean, who recoiled.

"Is it true that I am to be released?" he said, in an almost inarticulate voice, and as though he were talking in his sleep.

"Yes, thou art released; dost thou not understand?" said one of the gendarmes.

"My friend," resumed the Bishop, "before you go, here are your candlesticks. Take them."

211

213

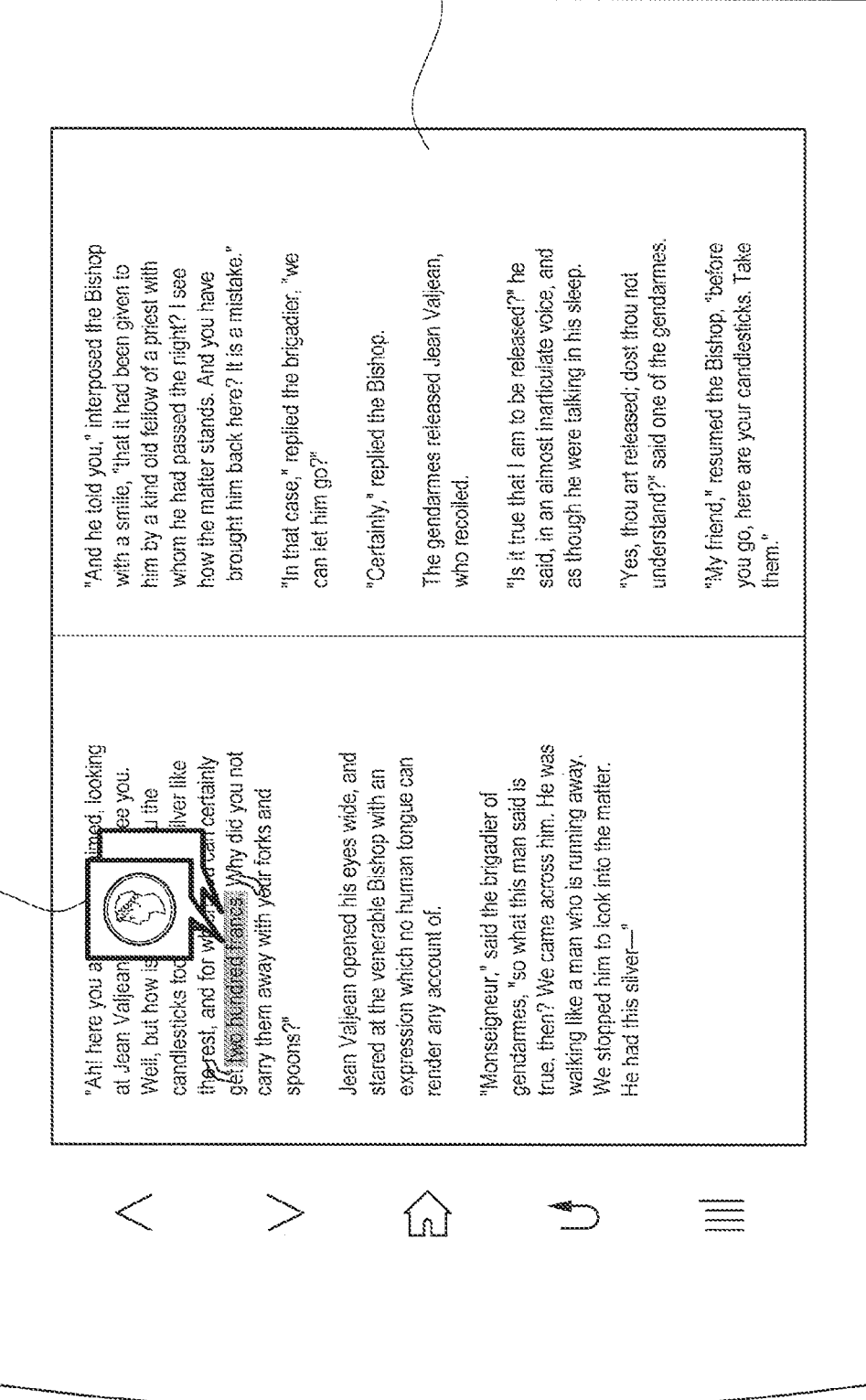

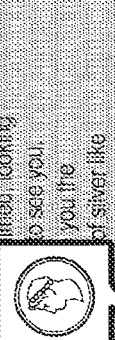

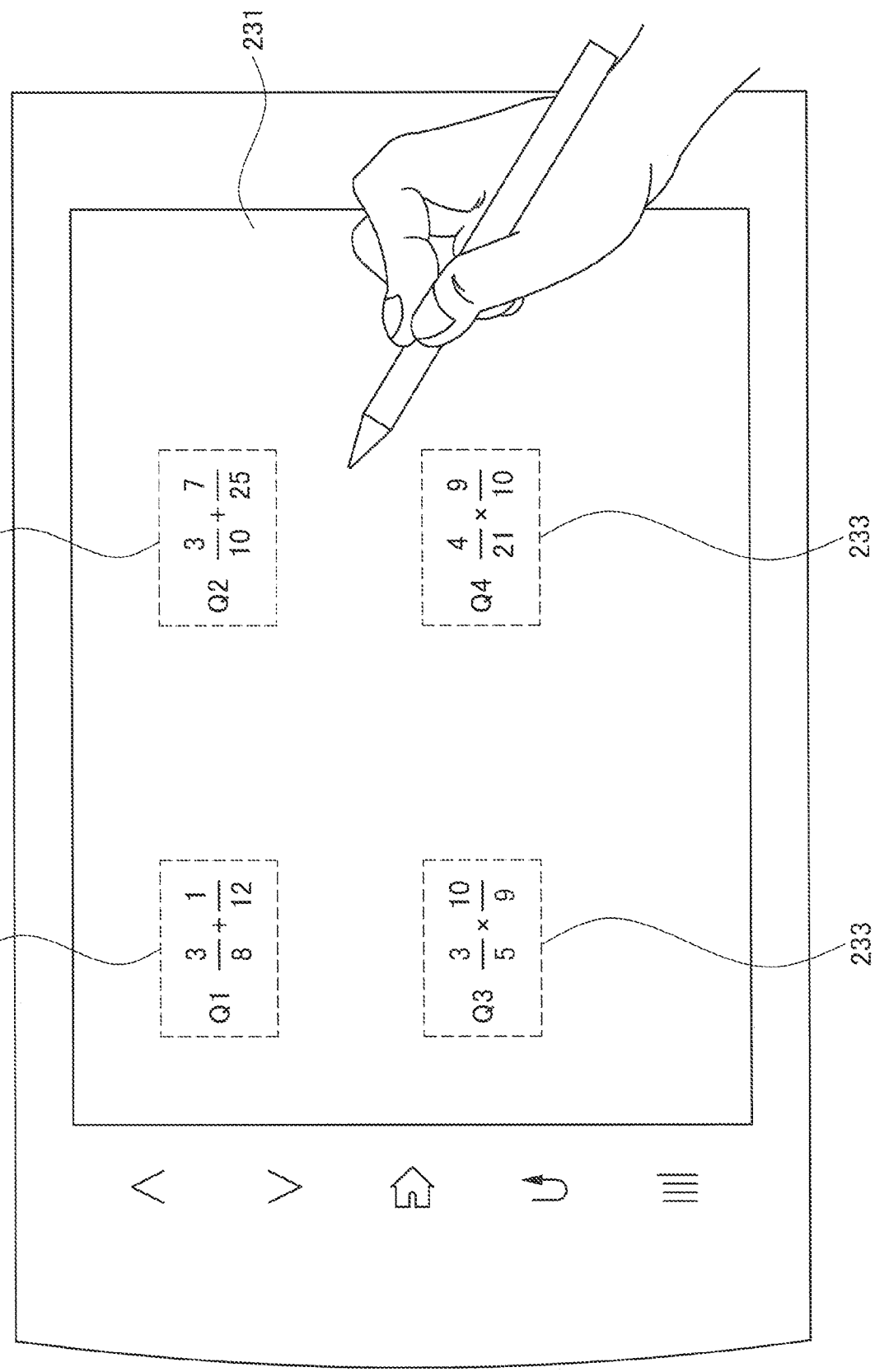

FIG. 14

INFORMATION PROCESSING TO GENERATE SCREEN BASED ON ACQUIRED EDITING INFORMATION

TECHNICAL FIELD

The present disclosure relates to information processing devices, information processing methods, and programs.

BACKGROUND ART

Recently, it has become common to read electronic book content by using a terminal or application for reading electronic books. In such electronic book content, readers sometimes add comments to the main body and images.

For example, according to a technology disclosed in Patent Literature 1, readers are capable of adding comments by designating coordinates on magazines serving as the electronic book content.

CITATION LIST

Patent Literature

Patent Literature 1: JP 2011-272849A

SUMMARY OF INVENTION

Technical Problem

However, according to the technology disclosed in Patent Literature 1, positions in pages are designated using the coordinates and the comments are added because each page of the magazines is loaded as an image to create the electronic book content. Therefore, it is impossible for the technology disclosed in Patent Literature 1 to display the electronic book content reflecting editing performed by users, and to change layout of the electronic book content together with the added comments.

Accordingly, the present disclosure proposes a novel and improved information processing device, information processing method and program capable of flexibly generating display of the electronic book content in which a content has been changed.

Solution to Problem

According to the present disclosure, there is provided an information processing device including: an information acquiring unit that acquires editing information for electronic book content, and position information indicating an area linked to the editing information in the electronic book content; and a screen generating unit that generates a screen in which the area indicated by the position information has been edited using the editing information.

According to the present disclosure, there is provided an information processing method including: acquiring editing information for electronic book content, and position information indicating an area linked to the editing information in the electronic book content; and generating, by a processor, a screen in which the area indicated by the position information has been edited using the editing information.

According to the present disclosure, there is provided a program causing a computer to function as: an information acquiring unit that acquires editing information for electronic book content, and position information indicating an area linked to the editing information in the electronic book content; and a screen generating unit that generates a screen in which the area indicated by the position information has been edited using the editing information.

According to the present disclosure, there is provided an information processing device including: an information acquiring unit that acquires additional information for electronic book content, and position information representing a position of an image linked to the additional information in the electronic book content and a position on the image by using a sentence structure of the electronic book content; and a screen generating unit that generates a screen in which display at the position on the image indicated by the position information, and the additional information are arranged in association with each other.

According to the present disclosure, there is provided an information processing method including: acquiring additional information for electronic book content, and position information representing a position of an image linked to the additional information in the electronic book content and a position on the image by using a sentence structure of the electronic book content; and generating, by a processor, a screen in which display of the position on the image indicated by the position information, and the additional information are arranged in association with each other.

According to the present disclosure, there is provided a program causing a computer to function as: an information acquiring unit that acquires additional information for electronic book content, and position information representing a position of an image linked to the additional information in the electronic book content and a position on the image by using a sentence structure of the electronic book content; and a screen generating unit that generates a screen in which display of the position on the image indicated by the position information, and the additional information are arranged in association with each other.

According to the present disclosure, it is possible to display the electronic book content reflecting editing performed by users, and to change layout of the electronic book content together with the added comments.

Advantageous Effects of Invention

As described above, according to the present disclosure, it is possible to flexibly generate display of the electronic book content in which a content has been changed.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 2 is a block diagram showing an internal configuration of an information processing device according to a first embodiment.

FIG. 3 is an explanatory diagram showing an example of an information table stored in an information storage unit.

FIG. 10 is an explanatory diagram showing an example of the screen generated by the information processing device according to the first embodiment in the first application example.

FIG. 11 is an explanatory diagram showing an example of the screen generated by the information processing device according to the first embodiment in the first application example.

FIG. 12 is an explanatory diagram showing an example of the screen generated by the information processing device according to the first embodiment in the first application example.

FIG. 13 is an explanatory diagram showing an example of a screen generated by the information processing device according to the first embodiment in a second application example.

FIG. 14 is an explanatory diagram showing an example of the screen generated by the information processing device according to the first embodiment in the second application example.

DESCRIPTION OF EMBODIMENT(S)

Figure 1:
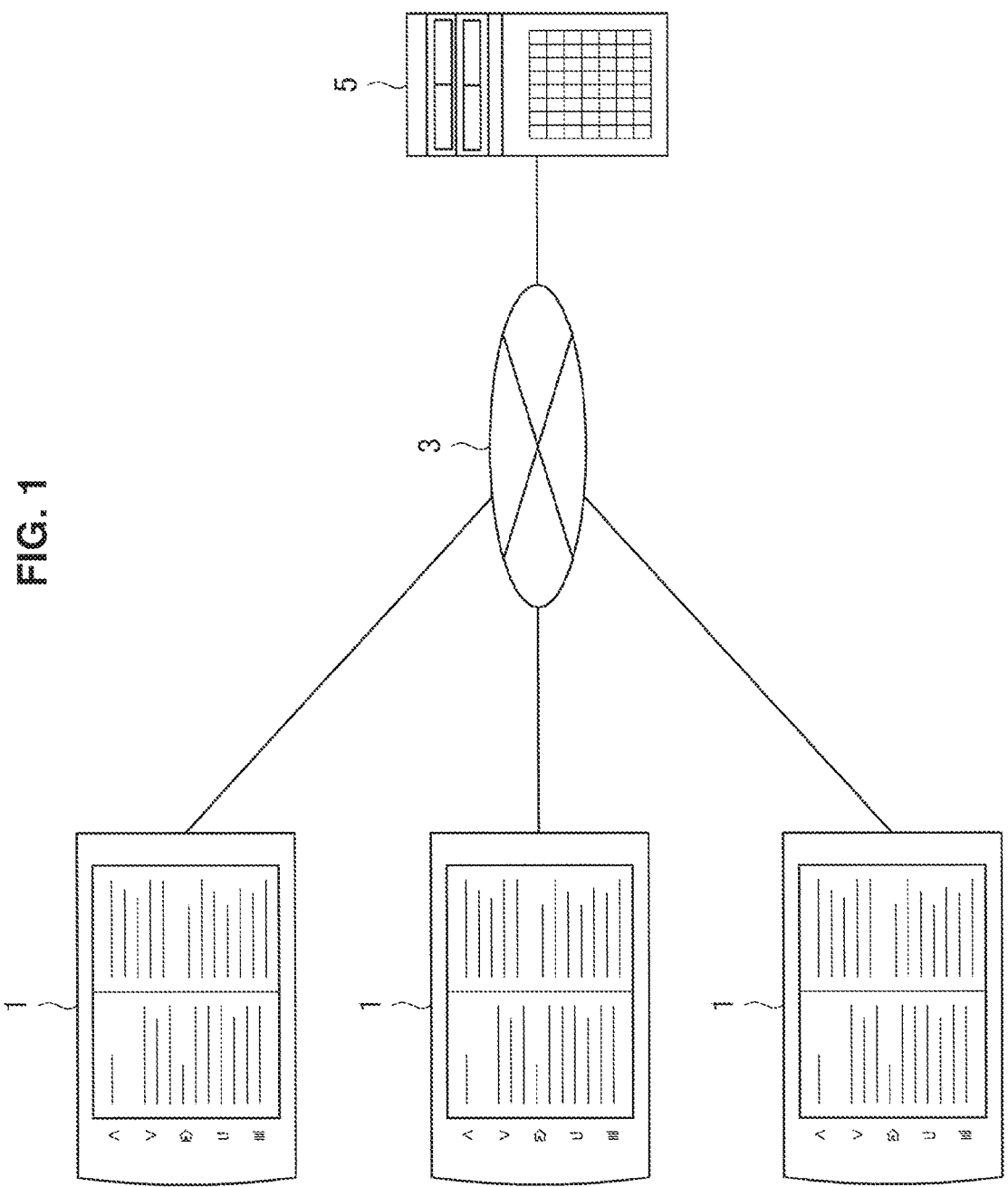
FIG. 1 is an explanatory diagram illustrating an overview of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and redundant explanation of these structural elements is omitted.

Note that the description is given in the following order.
1. Overview of Information Processing Device according to Embodiment of Present Disclosure
2. First Embodiment
2.1. Internal Configuration of Information Processing Device
2.2. Operation of Information Processing Device
2.3. First Application Example of Information Processing Device
2.4. Second Application Example of Information Processing Device
3. Second Embodiment
3.1. Internal Configuration of Information Processing Device
3.2. Operation of Information Processing Device
3.3. Application Example of Information Processing Device
4. Third Embodiment
4.1. Internal Configuration of Information Processing Device
4.2. Application Example of Information Processing Device
5. Hardware Configuration Example of Information Processing Device according to Embodiment of Present Disclosure
6. Conclusion

1. OVERVIEW OF INFORMATION PROCESSING DEVICE ACCORDING TO EMBODIMENT OF PRESENT DISCLOSURE

First, with reference to FIG. 1, an overview of an information processing device according to an embodiment of the present disclosure is described. FIG. 1 is an explanatory diagram illustrating an overview of an information processing device 1 according to an embodiment of the present disclosure.

As shown in FIG. 1, the information processing device 1 according to the embodiment of the present disclosure is connected to an information processing server 5 via a public network 3. Alternatively, a plurality of information processing devices 1 may be connected to the information processing server 5 via the public network 3.

The information processing device 1 generates a screen displaying electronic book content. Specifically, the information processing device 1 generates a screen displaying electronic book content stored in the information processing server 5 or the information processing device 1, and causes a display device included in the information processing device 1 to display the generated screen. Alternatively, the information processing device 1 may cause an externally-connected display device to display the generated screen.

In addition, the information processing device 1 generates a screen in which editing information indicating a content of editing performed by a user on electronic book content, additional information indicating a content of an added comment or the like, and the electronic book content are displayed together. Specifically, the information processing device 1 acquires editing information and additional information of the electronic book content stored in the information processing server 5 or the information processing device 1. In addition, the information processing device 1 edits an area linked to the editing information in the electronic book content using the editing information, and generates a screen in which the additional information and an area linked to the additional information in the electronic book content are arranged in association with each other.

The editing means that a user rewrites or adds the main body of the electronic book content in a certain area in the electronic book content. The editing information indicates the rewritten main body or additional main body in the area. The addition means that a user adds information such as a comment other than the main body in the electronic book content. The additional information indicates the added information. The editing information and the additional information may be any of text such as a comment, a still image, a moving image, an audio, and the like.

The information processing device 1 generates the editing information and the additional information on the basis of user input. Specifically, the information processing device 1 links editing information and an edited area to the editing information input by the user, and links additional information and an area in which addition has been performed to the additional information input by the user. In addition, the information processing device 1 transmits the editing information, the additional information, and position information of the linked areas to the information processing server 5, and causes the information processing server 5 to store them.

The position information of the linked area in the electronic book content is represented using a sentence structure of the electronic book content. According to such a configuration, the information processing device 1 can change the layout of the electronic book content while maintaining a link between the editing information, the additional information, and the area in the electronic book content, even in the case where the layout of the electronic book content to be displayed has been changed.

The information processing device 1 may include a display device such as a liquid crystal display (LCD) device, an organic light emitting diode (OLED) device, a plasma display device, or a cathode ray tube (CRT) display device so as to display a screen of the electronic book content or the like on the display device. Alternatively, as described above, the information processing device 1 may include no display device, and may cause an external display device connected to the information processing device 1 to display the screen of the electronic book content.

The public network 3 is a wired or wireless information transmission line capable of transmitting and receiving information between the information processing device 1 and the information processing server 5. The public network 3 may be a public network, a local area network (LAN), a wide area network (WAN), or the like, the public network including the Internet, a satellite communication network, a telephone network, and the like.

The information processing server 5 stores editing information and additional information received from each information processing device 1. Specifically, the information processing server 5 ensures consistency between the editing information and the additional information received from each information processing device 1, and position information of areas linked to the editing information and the additional information, and stores the editing information, the additional information, and the position information. In addition, the information processing server 5 transmits the editing information, additional information, position information of the linked areas stored therein to the information processing device 1 in response to a request from the information processing device 1.

According to such a configuration, the information processing server 5 can collect and store the editing information and additional information input in each information processing device 1 via the public network 3. The information processing device 1 can share the editing information and the additional information with another information processing device 1 by acquiring the editing information and additional information from the information processing server 5. Accordingly, by using the information processing device 1, a user can edit electronic book content while sharing the electronic book content that is being edited, added comments, and the like with other users, for example.

As described above, by using the information processing device 1 according to the embodiment of the present disclosure, it is possible to generate a screen in which electronic book content has been edited by the editing information and change the layout of the electronic book content while maintaining arrangement of an image linked to additional information. As described above, according to the present disclosure, it is possible for the information processing device 1 to flexibly generate display of the electronic book content in which a content has been changed.

Note that, in the electronic book content, editing information after editing may be changed from editing information to the main body of the electronic book content in the case where a predetermined time has elapsed or in the case where an author has selected to do so.

The electronic book content may be stored in any of the information processing device 1 and the information processing server 5. Note that, in the case where the electronic book content is stored in the information processing device 1, the information processing device 1 can generate a screen for displaying the electronic book content without connecting to the public network 3. Accordingly, it is more preferable that the electronic book content is stored in the information processing device 1.

According to the above, the editing information and the additional information are stored in the information processing server 5. However, the technology of the present disclosure is not limited thereto. For example, the editing information and the additional information may be stored in both of the information processing device 1 and the information processing server 5. In this case, it is preferable to synchronize the editing information and the additional information between the information processing device 1 and the information processing server 5 at a predetermined timing (for example, at a time when the information processing device 1 is booted, or for each day).

2. FIRST EMBODIMENT

The following describes an information processing device 100 according to a first embodiment of the present disclosure with reference to FIGS. 2 to 17. The information processing device 100 according to the first embodiment of the present disclosure can generate a screen for displaying electronic book content reflecting editing performed by a user.

Here, according to the technology disclosed in Patent Literature 1, readers are capable of adding comments by designating coordinates on magazines serving as the electronic book content. However, according to the technology disclosed in Patent Literature 1, the user cannot edit the main body of the electronic book content to display the electronic book content reflecting the edited content.

Accordingly, an information processing device by which a user can edits the main body of the electronic book content is being desired so as to generate a screen of the electronic book content reflecting the edited content. By using the information processing device 100 according to the first embodiment of the present disclosure, it is possible to edit the main body of the electronic book content and generate editing information. It is also possible for the information processing device 100 to generate a screen in which an area of the electronic book content linked to the editing information has been edited by the editing information.

[2.1. Internal Configuration of Information Processing Device]

First, with reference to FIG. 2, an internal configuration of the information processing device 100 according to the first embodiment of the present disclosure is described. FIG. 2 is a block diagram showing an internal configuration of the information processing device 100 according to the first embodiment of the present disclosure.

As shown in FIG. 2, the information processing device 100 according to the first embodiment of the present disclosure includes a communication unit 101, an information storage unit 103, an information acquiring unit 105, a content storage unit 107, a structural analysis unit 109, a screen generating unit 111, a display unit 113, an input unit 115, and an information linking unit 117. In addition, the information processing device 100 is connected to the information processing server 5 via the public network 3. The public network 3 and the information processing server 5 are substantially the same as the configurations of those described with reference to FIG. 1. Accordingly, redundant description is omitted.

The communication unit 101 transmits and receives information to and from the information processing server 5 via the public network 3. Specifically, the communication unit 101 receives the editing information, the additional information, and position information of areas linked to the editing information and the additional information that are stored in the information processing server 5. In addition, to the information processing server 5, the communication unit 101 transmits the editing information and additional information input by the input unit 115, and position information of areas linked by the information linking unit 117 to the editing information and the additional information.

The information storage unit 103 stores the editing information, the additional information, and position information of areas linked to those information. Specifically, the information storage unit 103 stores the editing information, the additional information, the position information of areas linked to the editing information and the additional information, and a link between the editing information, the additional information, and position information.

In the information processing device 100, the position information of the areas linked to the editing information and the additional information is represented using a sentence structure of the electronic book content. The sentence structure of the electronic book content means the structure of the main body of the electronic book content represented by chapters, sections, paragraphs, sentences, and the like. Accordingly, the information processing device 100 can designate an area in the electronic book content without using coordinates of pages. For example, even in the case where the character size has been changed and therefore the layout has been changed, it is possible to maintain position designation with respect to characters. As such a position designation method using a sentence structure of electronic book content, Canonical Fragment Identifier (CFI) of EPUB 3 or the like designed by International Digital Publishing Forum may be used.

More specifically, the information storage unit 103 stores the editing information, the additional information, and position information of areas linked to those information by using an information table shown in FIG. 3, for example. FIG. 3 is an explanatory diagram showing an example of the information table stored in the information storage unit 103.

As shown in FIG. 3, for example, the information table stored in the information storage unit 103 includes items including "information category" indicating whether information is editing information or additional information, "position information" indicating a position of a linked area, "information type" indicating a type of the editing information or additional information, and "content" indicating a content of the editing information or additional information.

For example, in the information table shown in FIG. 3, "editing information" whose "information type" is "text" and whose "content" is "girls sitting next to each other" is linked to "position information" of an area "from section 1, paragraph 22, 86th letter to section 1, paragraph 22, 100th letter". In addition, "editing information" whose "information type" is "still image" and whose "content" is "illustration.bmp" is linked to "position information" of a position "after section 1, paragraph 22, 145th letter". In addition, "additional information" whose "information type" is "text" and whose "content" is "This is exactly what I expected!" is linked to "position information" of an area "from section 1, paragraph 24, 22th letter to section 1, paragraph 24, 44th letter".

According to the information table shown in FIG. 3, the information processing device 100 edits and replace the main body in the area "from section 1, paragraph 22, 86th letter to section 1, paragraph 22, 100th letter" with the text "girls sitting next to each other". In addition, the information processing device 100 newly inserts the still image "illustration.bmp" to the position "after section 1, paragraph 22, 145th letter" by editing. In addition, the information processing device 100 adds the text comment "This is exactly what I expected!" to the main body of the area "from section 1, paragraph 24, 22th letter to section 1, paragraph 24, 44th letter".

The information acquiring unit 105 acquires the editing information, the additional information, and position information of areas linked to the editing information and the additional information. Specifically, the information acquiring unit 105 acquires the editing information, the additional information, and position information of areas linked to the editing information and the additional information, from the information storage unit 103 or the information processing server 5.

For example, the information acquiring unit 105 may acquire the editing information, the additional information, and position information of areas linked to the editing information and the additional information, from the information processing server 5 usually. However, in the case where communication with the information processing server 5 is impossible, the information acquiring unit 105 may acquire these information from the information storage unit 103. Alternatively, the information acquiring unit 105 may always acquire the editing information, the additional information, and position information of areas linked to the editing information and the additional information from the information storage unit 103. In this case, it is preferable for the information acquiring unit 105 to synchronize the information table stored in the information processing server 5 and the information table stored in the information storage unit 103 at a predetermined timing (for example, at a time when the information processing device 100 is booted, or for each day).

The content storage unit 107 stores the electronic book content. Specifically, the content storage unit 107 stores the electronic book content acquired via the public network 3 or the like. Note that, the content storage unit 107 may store a plurality of pieces of electronic book content.

The electronic book content stored in the content storage unit 107 may be reflowable content having the dynamic fluid layout. The reflowable content is content whose layout can be changed dynamically in accordance with change in a display screen size and character size. Specifically, the electronic book content stored in the content storage unit 107 may have a format based on EPUB (more specifically, EPUB 3) or the like designed by International Digital Publishing Forum, for example.

The structural analysis unit 109 analyzes the sentence structure of the electronic book content. Specifically, the structural analysis unit 109 analyzes the sentence structure of the electronic book content stored in the content storage unit 107, and provides information necessary for the screen generating unit 111 to designate areas linked to the editing information and the additional information.

The screen generating unit 111 generates a screen displaying the electronic book content, the editing information, and the additional information. Specifically, the screen generating unit 111 specifies areas linked to the editing information and additional information acquired by the information acquiring unit 105, on the basis of position information of the areas linked to the editing information and additional information, and the sentence structure of the electronic book content analyzed by the structural analysis unit 109. Next, the screen generating unit 111 generates a screen in which the area linked to the editing information has been edited using the editing information in the electronic book content. In addition, the screen generating unit 111 generates a screen in which display of the area linked to the additional information and the additional information are arranged in association with each other. Note that, in the case where a piece of the additional information is linked to another piece of the additional information, the screen generating unit 111 may generate a screen in which the piece of the additional information and the another piece of the additional information are arranged in association with each other.

The screen generating unit 111 may generate a screen in which display of the area linked to the editing information or the additional information is emphasized by a highlighter or the like. According to this configuration, the screen generating unit 111 can generate a screen displaying the areas linked to the editing information and the additional information to a user in an understandable way.

Alternatively, the screen generating unit 111 may generate a screen in which the display of the area linked to the editing information or additional information has been changed on the basis of the linked editing information or additional information.

Specifically, the screen generating unit 111 may generate a screen that does not display all pieces of additional information with regard to an area linked to the plurality of pieces of additional information, but displays a piece of the linked additional information as representative additional information. According to this configuration, the screen generating unit 111 can notify the user that the plurality of pieces of additional information are linked, without lowering the visibility of the electronic book content in the case of displaying the area linked to the plurality of pieces of additional information in the electronic book content.

Alternatively, the screen generating unit 111 may generate a screen in which an effect has been added to the area linked to the additional information on the basis of the number of pieces of the linked additional information. According to this configuration, the screen generating unit 111 can emphasize the area linked to many pieces of the additional information to the user. Note that, the screen generating unit 111 may determines whether or not to add the effect to the area in the electronic book content, by considering whether or not the number of pieces of the additional information linked to the area is greater than or equal to a threshold, for example. Alternatively, whether or not to add the effect may be determined by considering whether or not the number of pieces of linked additional information is greater than or equal to an average of the number of pieces of additional information in areas linked to additional information. Alternatively, whether or not to add the effect may be determined by considering whether or not the additional information greater than or equal to the threshold is linked within a predetermined time.

Note that, details of the screen generated by the screen generating unit 111 are described in [2.3. First Application Example of Information Processing Device] and [2.4. Second Application Example of Information Processing Device]

The display unit 113 displays the screen including the electronic book content, the editing information, and the additional information. Specifically, the display unit 113 displays the screen generated by the screen generating unit 111, the screen including the electronic book content, the editing information, and the additional information. The display unit 113 may be the display device such as the liquid crystal display device, the OLED device, the plasma display device, or the CRT display device. Alternatively, the display unit 113 may be a touchscreen device integrated with the input unit 115 (to be described later).

To the input unit 115, the user inputs the editing information and the additional information. Specifically, the input unit 115 includes an input device to which the user inputs information, an input control circuit that generates an input signal on the basis of the user input and outputs the generated input signal to the information linking unit 117, and the like. The input unit 115 may be the touchscreen device integrated with the display unit 113.

On the basis of the user input, the information linking unit 117 links the editing information to an edited area, and links additional information and an area in which addition has been performed. Specifically, the information linking unit 117 acquires the editing information and the additional information from the input unit 115, links the editing information to the edited area, and links the additional information and the area in which addition has been performed. Note that, the information linking unit 117 may link a piece of additional information to another piece of additional information on the basis of user input.

As described with regard to the information storage unit 103, the information linking unit 117 represents the position information indicating the areas linked to the editing information and the additional information by using the sentence structure of the electronic book content. For example, the information linking unit 117 may represent the position information indicating the areas linked to the editing information and the additional information by CFI.

As described above, by using the information processing device 100 according to the first embodiment of the present disclosure, it is possible to edit the main body of the electronic book content and generate editing information. It is also possible for the information processing device 100 to generate a screen in which an area of the electronic book content linked to the editing information has been edited by the editing information. In a similar way, it is also possible for the information processing device 100 to add additional information to an area in the electronic book content, and generate a screen in which the additional information and the area linked to the additional information are arranged in association with each other.

Figure 4:
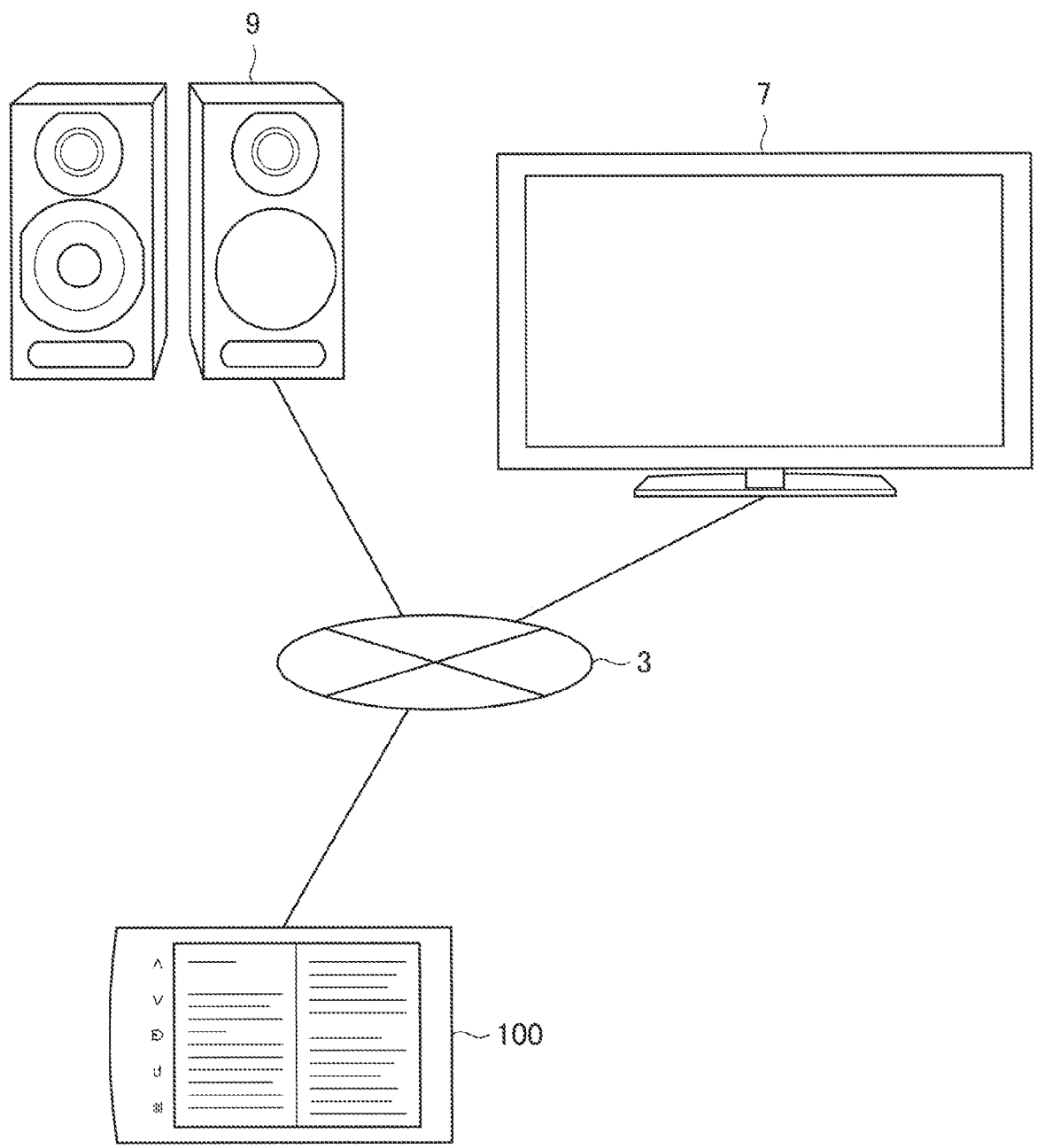
FIG. 4 is an explanatory diagram showing a usage example of the information processing device according to the first embodiment.

As shown in FIG. 4, it is possible to use the information processing device 100 according to the first embodiment of the present disclosure connected to external equipment. FIG. 4 is an explanatory diagram showing a usage example of the information processing device 100 according to the first embodiment of the present disclosure.

As shown in FIG. 4, for example, the information processing device 100 may be connected to a display device 7 such as a television device and an audio output device 9 such as a speaker, directly or via the public network 3. In this case, the information processing device 100 can cause the display device 7 and the audio output device 9 to output a text, still image, moving image, audio, and the like that are linked as the editing information and the additional information to the electronic book content, while displaying the electronic book content. For example, in the case where the audio or the moving image is linked as the additional information to the area in the electronic book content, the information processing device 100 may cause the display device 7 or the audio output device 9 to output the linked audio or moving image while displaying the area.

[2.2. Operation of Information Processing Device]

Figure 5:
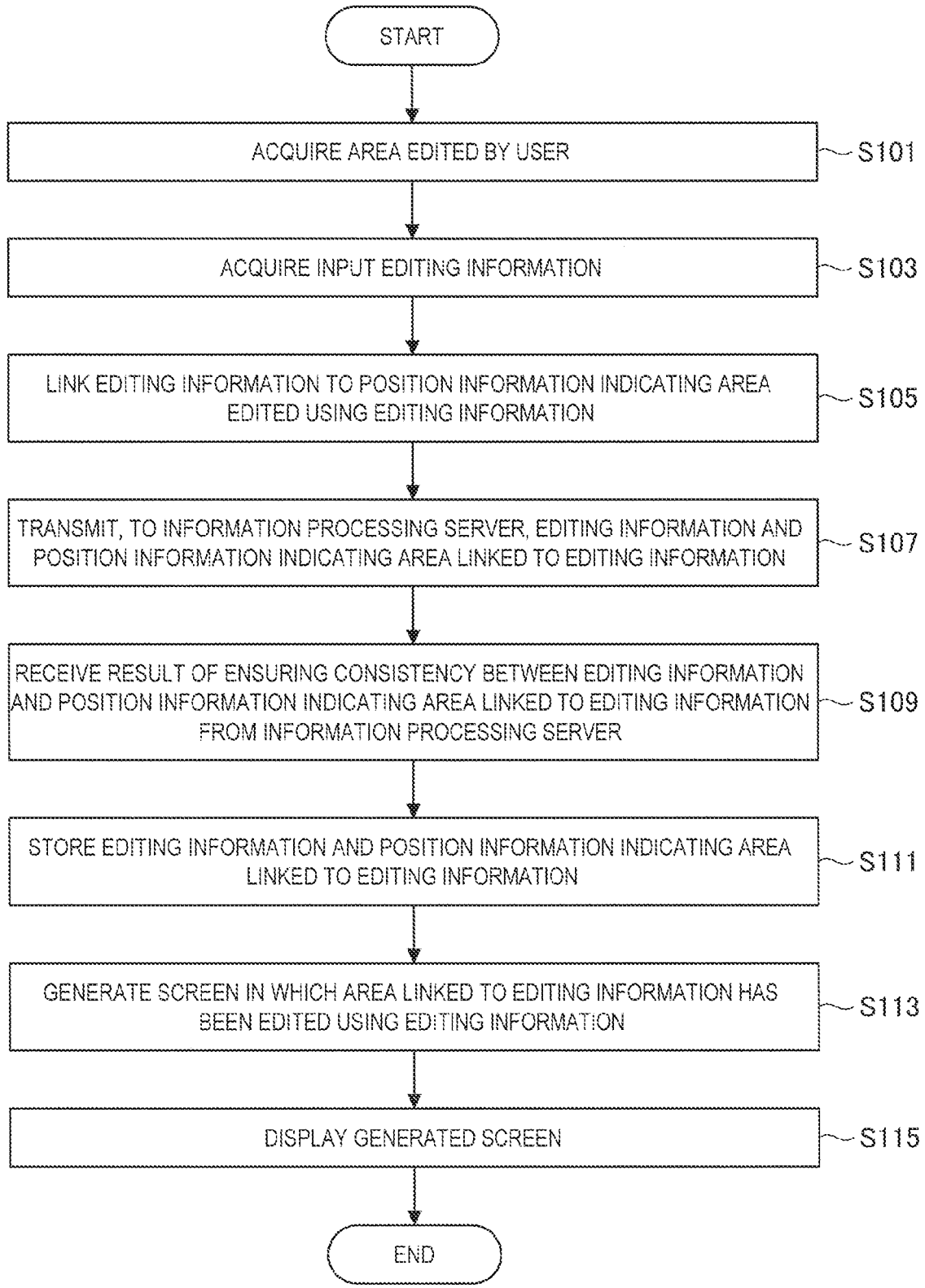
FIG. 5 is a flowchart illustrating an operation of the information processing device according to the first embodiment.

Next, with reference to FIG. 5, an operation of the information processing device 100 according to the first embodiment of the present disclosure is described. FIG. 5 is a flowchart illustrating an operation of the information processing device 100 according to the first embodiment of the present disclosure.

As shown in FIG. 5, first, the information linking unit 117 of the information processing device 100 acquires an area edited by the user from the input unit 115 (S101). In addition, the information linking unit 117 acquires editing information input in the input unit 115 (S103). In addition, the information linking unit 117 links the acquired editing information to position information indicating the area edited using the editing information (S105).

Next, the communication unit 101 transmits, to the information processing server 5, the editing information linked by the information linking unit 117 and the position information indicating the area linked to the editing information (S107). Here, the information processing server 5 ensures consistency between the editing information and position information indicating the area linked to the editing information that have been received from the information processing device 100, and editing information received from another information processing device (not shown). Subsequently, after ensuring their consistency, the communication unit 101 receives the editing information and position information indicating the area linked to the editing information from the information processing server 5 (S109).

Note that, the editing information received in S109 may include editing information indicating editing performed on the electronic book content in another information processing device. In addition, the position information indicating the area linked to the editing information may include position information indicating the area linked to the editing information.

Next, after ensuring their consistency, the information acquiring unit 105 causes the information storage unit 103 to store the editing information and position information indicating the area linked to the editing information that have been received by the communication unit 101 from the information processing server 5 (S111). In addition, the screen generating unit 111 generates a screen in which the area linked to the editing information has been edited using the editing information (S113). Subsequently, the display unit 113 displays the screen generated by the screen generating unit 111 (S115).

According to the operation, the information processing device 100 can edit the main body of electronic book content, generate editing information, and generate a screen in which an area of the electronic book content linked to the editing information has been edited by the editing information.

The above describes the operation of the information processing device 100 with regard to the editing information. The information processing device 100 may operate in a similar way also with regard to the additional information.

[2.3. First Application Example of Information Processing Device]

Next, with reference to FIGS. 6 to 12, a first application example of the information processing device 100 according to the first embodiment of the present disclosure is described. FIGS. 6 to 12 are each an explanatory diagram showing an example of a screen generated by the information processing device 100 according to the first embodiment of the present disclosure in the first application example. For example, electronic book content displayed by the information processing device 100 in the first application example is a novel which is being edited.

First, FIGS. 6 to 9 show a series of screen examples when an author request readers to post a still image during editing electronic book content and adds the posted still image as an illustration to the electronic book content.

Figure 6:
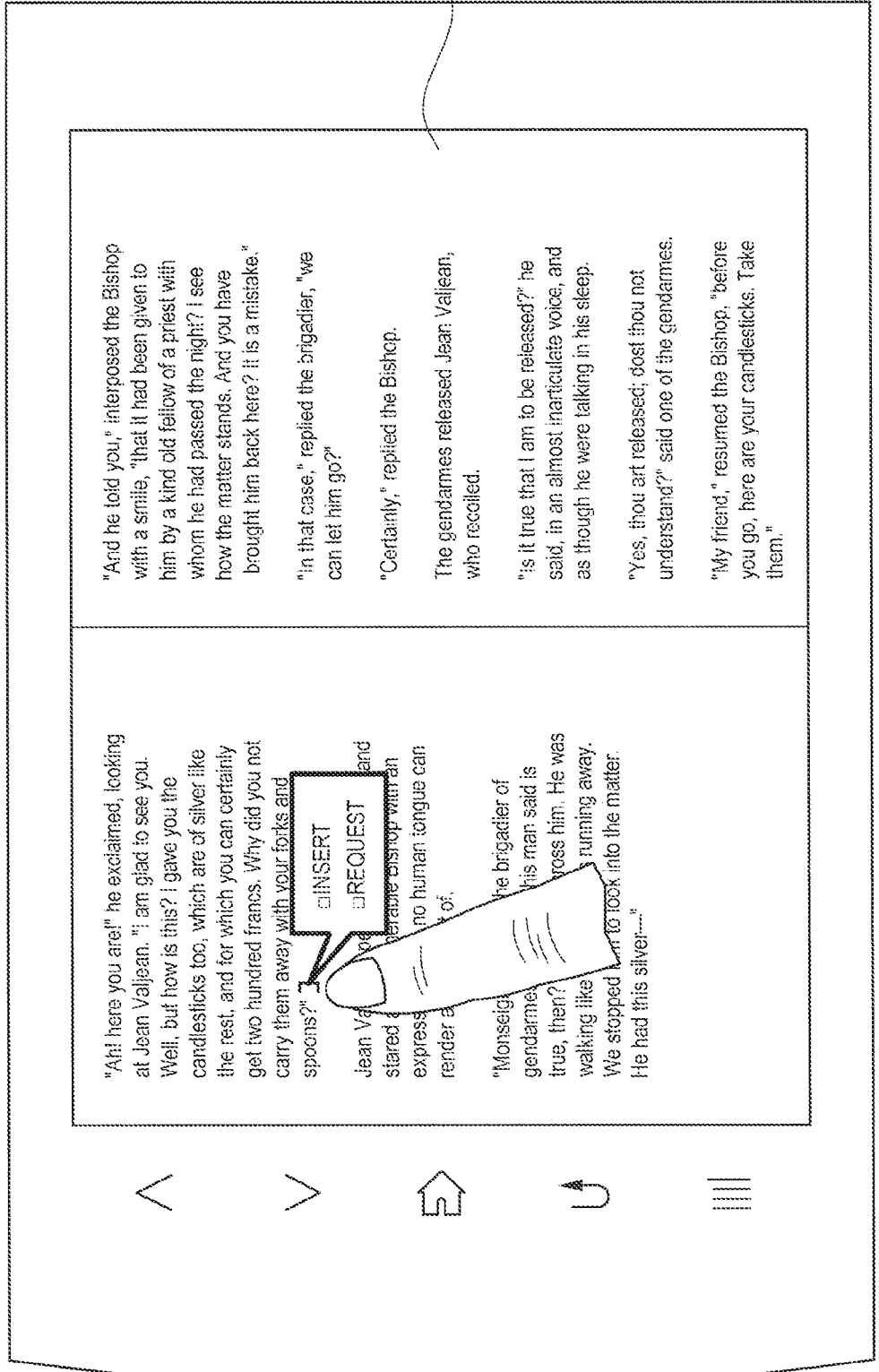
FIG. 6 is an explanatory diagram showing an example of a screen generated by the information processing device according to the first embodiment in a first application example.

An screen example 201 shown in FIG. 6 is a screen example in which the author selects end of a sentence " . . . spoons?" Specifically, the author selects the end of the sentence " . . . spoons?" by a long press or the like on the touchscreen device, and therefore the end of the sentence " . . . spoons?" becomes editable. Here, the screen example 201 shows a dialogue with options including "insert" and "request".

Figure 7:
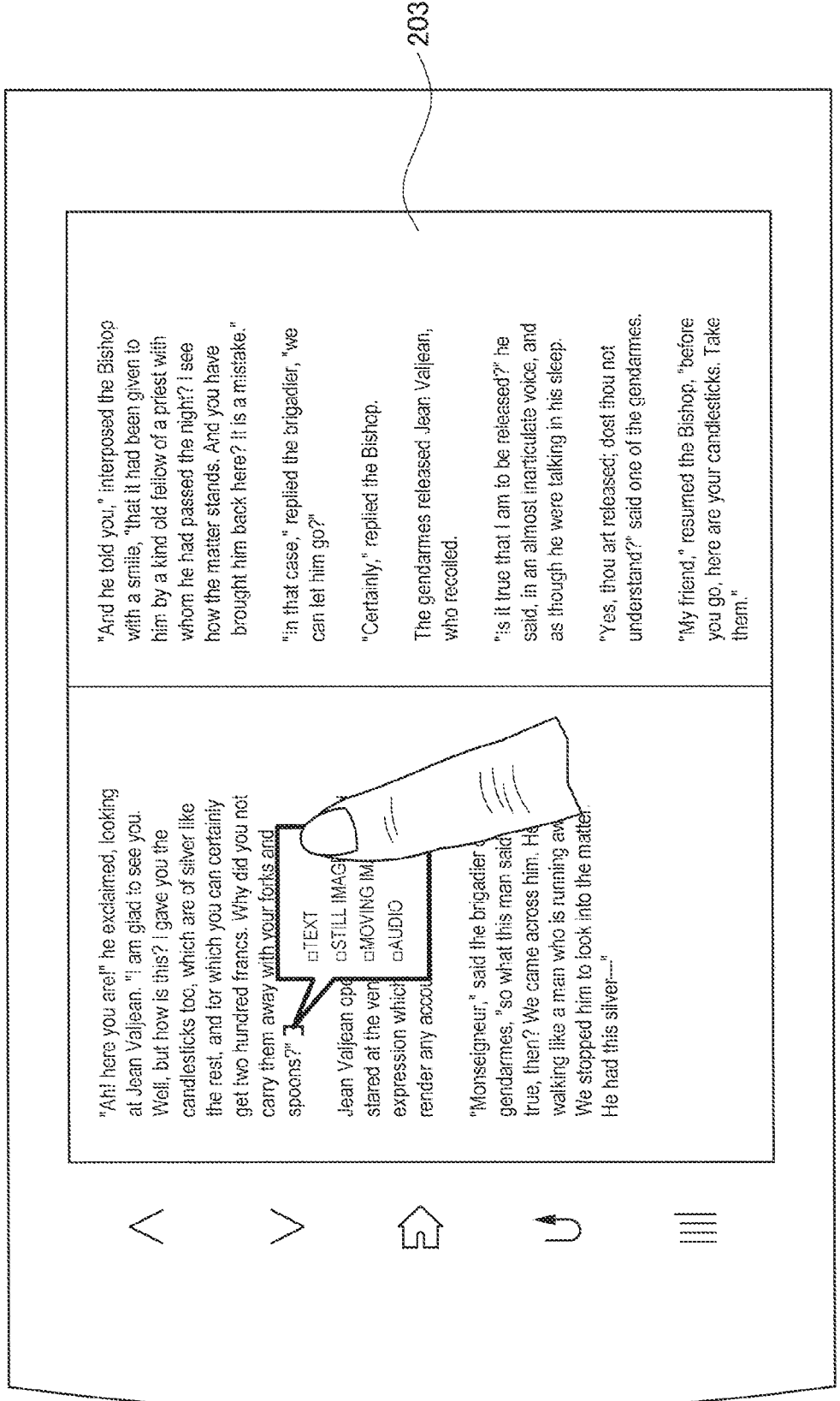
FIG. 7 is an explanatory diagram showing an example of the screen generated by the information processing device according to the first embodiment in the first application example.

Next, a screen example 203 shown in FIG. 7 is a screen example in which the author has selected "request" in the dialogue in the screen example 201 shown in FIG. 6. Specifically, a dialogue for selecting contents to be requested is displayed after the author has selected "request". Here, the screen example 203 shows a dialogue with options including "text", "still image", "moving image", and "audio", and the author selects the "still image", for example.

Figure 8:
FIG. 8 is an explanatory diagram showing an example of the screen generated by the information processing device according to the first embodiment in the first application example.

Next, a screen example 205 shown in FIG. 8 is a screen example in which the author has selected "still image" in the dialogue in the screen example 203 shown in FIG. 7.

Specifically, an icon 206 meaning the request for the illustration and the like is displayed at the end of the sentence " . . . spoons?" selected by the author, and subsequent sentences are moved to a next page. In addition, the author may add a comment for the request. In this case, the comment added by the author may be displayed like a speech balloon from the icon 206.

Figure 9:
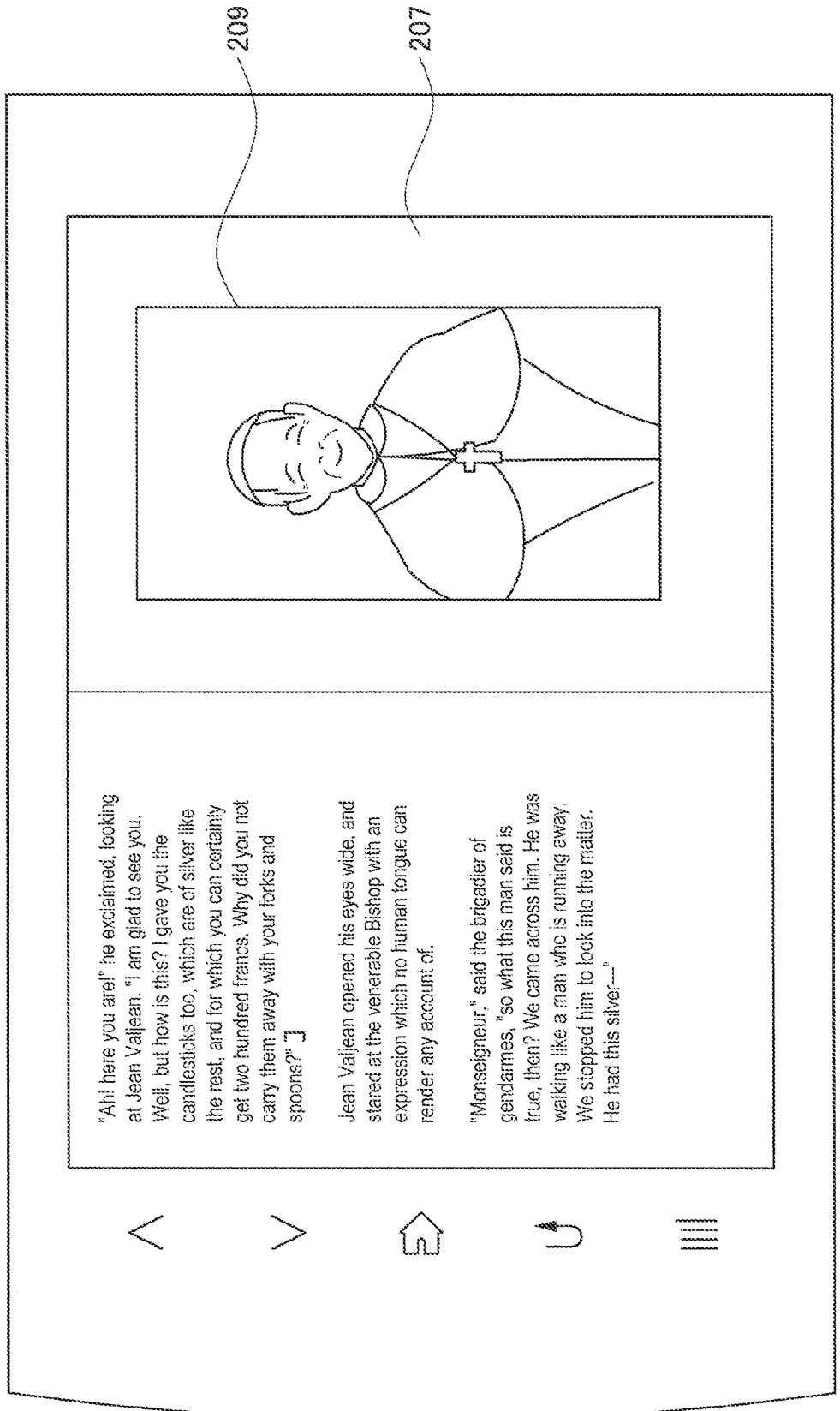
FIG. 9 is an explanatory diagram showing an example of the screen generated by the information processing device according to the first embodiment in the first application example.

Next, a screen example 207 shown in FIG. 9 is a screen example in which a still image 209 selected as the illustration by the author from among still images offered in the screen example 205 shown in FIG. 8 is added by editing. Specifically, the still image 209 that the author has decided to use as the illustration is added to the end of the sentence " . . . spoons?" by editing. In this case, the editing information is the still image 209, and an area linked to the still image 209 is the end of the sentence " . . . spoons?"

Alternatively, as shown in FIG. 9, the information processing device 100 may display the still image 209 added to the electronic book content by the editing on a page next to the page including the end of the sentence " . . . spoons?" linked to the still image 209. This configuration enables the information processing device 100 to display the still image 209 as an illustration having an identical size regardless of an area to which the still image 209 is linked. In addition, in a way similar to the still image, the information processing device 100 may display a moving image on a page next to a page including a linked area.

Although not shown in the drawings, in the case where a reader selects the icon 206 in the screen example 205 in FIG. 8, the information processing device 100 may receive posted data depending on the requested content. For example, in the case where the author requests a text, the information processing device 100 may display a text input box. In the case where the author requests a still image, a moving image, or audio, the information processing device 100 may encourage readers to select corresponding data held by the readers, or may shoot an image or record sounds to generate the corresponding data.

FIG. 10 shows a screen example when the author has edited and rewritten the main body of the electronic book content, for example.

A screen example 211 shown in FIG. 10 is a screen example in which the author has edited and rewritten an editing part 213. Specifically, in the editing part 213, "the brigadier of gendarmes" is edited and rewritten to be "the patrol officer". In this case, for example, the editing information is "the patrol officer", and an area linked to the editing information is the area in which "the brigadier of gendarmes" had been displayed. The information processing device 100 may display the editing part 213 in an understandable way for readers by highlighting the editing part 213 or making the editing part 213 to be in boldface.

FIGS. 11 and 12 each show a screen example when additional information such as comments has been added to the electronic book content.

A screen example 215 shown in FIG. 11 is a screen example in which additional information such as comments are added and linked to "two hundred francs". Specifically, a still image 217 is linked as the additional information to "two hundred francs". In this case, the information processing device 100 may emphasize the display of "two hundred francs" that is the area linked to the additional information by highlighter or the like. On the other hand, in the case where the additional information is linked not to the area but to its position, the information processing device 100 may display an icon indicating that the additional information is linked.

Alternatively, for example, in the case where a plurality of pieces of additional information are linked to "two hundred francs", the information processing device 100 may display a piece of the linked additional information as representative additional information by using a speech balloon or the like, without displaying all pieces of the linked additional information. In this case, the piece of additional information displayed as the representative additional information is, for example, a piece of additional information to which the most pieces of additional information are linked.

In the case where the plurality of pieces of additional information are linked to "two hundred francs", the information processing device 100 may add an effect such as shaking to "two hundred francs" on the basis of the number of pieces of linked additional information. For example, in the case where the number of pieces of linked additional information is greater than or equal to a threshold, the information processing device 100 may add the effect to "two hundred francs". In the case where the number of pieces of linked additional information is greater than or equal to an average of the number of pieces of additional information in areas linked to additional information, the information processing device 100 may add the effect to "two hundred francs". Alternatively, in the case where the additional information greater than or equal to the threshold is linked within a predetermined time, the information processing device 100 may add the effect to "two hundred francs". As an effect other than the above described effects, for example, an effect such as causing characters in the area to blink, enlarging and reducing the characters, or highlighting display of the area may be added. Alternatively, as an effect, a font such as a size, color, style and the like of the characters in the area may be changed. A screen example 219 shown in FIG. 12 is a screen example in the case where a reader has selected "two hundred francs" to which a plurality of pieces of additional information are linked in the screen example 215 shown in FIG. 11. Specifically, when the reader selects an icon or the area to which the plurality of pieces of additional information are linked, display of the selected area and all pieces of linked additional information is brightened, and display of pieces of additional information linked to the other areas and the other pieces of electronic book content is darkened.

For example, in the screen example 219, a still image 217 and additional information "How much would it be worth in today's money?" are displayed in speech balloons and are linked to "two hundred francs". In addition, pieces of additional information "It seems that one million yen", "About 200,000 yen", and "Approximately 100,000 yen" are displayed in speech balloons and are linked to the additional information "How much would it be worth in today's money?" The information processing device 100 may install a button or the like for receiving endorsement from readers with regard to the pieces of additional information to conduct a questionnaire, vote, or the like.

[2.4. Second Application Example of Information Processing Device]

Next, with reference to FIGS. 13 to 17, a second application example of the information processing device 100 according to the first embodiment of the present disclosure is described. FIGS. 13 to 17 are each an explanatory diagram showing an example of a screen generated by the information processing device 100 according to the first embodiment of the present disclosure in the second application example. For example, electronic book content displayed by the information processing device 100 in the second application example is a workbook in which it is possible to write answers and correct the answers.

A screen example 231 shown in FIG. 13 is a screen example in which questions 233 are displayed and in which an answerer can input an answer. Specifically, the answerer can edit Q1 "3/8+1/12", and Q2 "3/10+7/25", Q3 "3/5×10/9", and Q4 "4/21×9/10" that are displayed as the questions 233 by text and the like to input answers.

Figure 14:
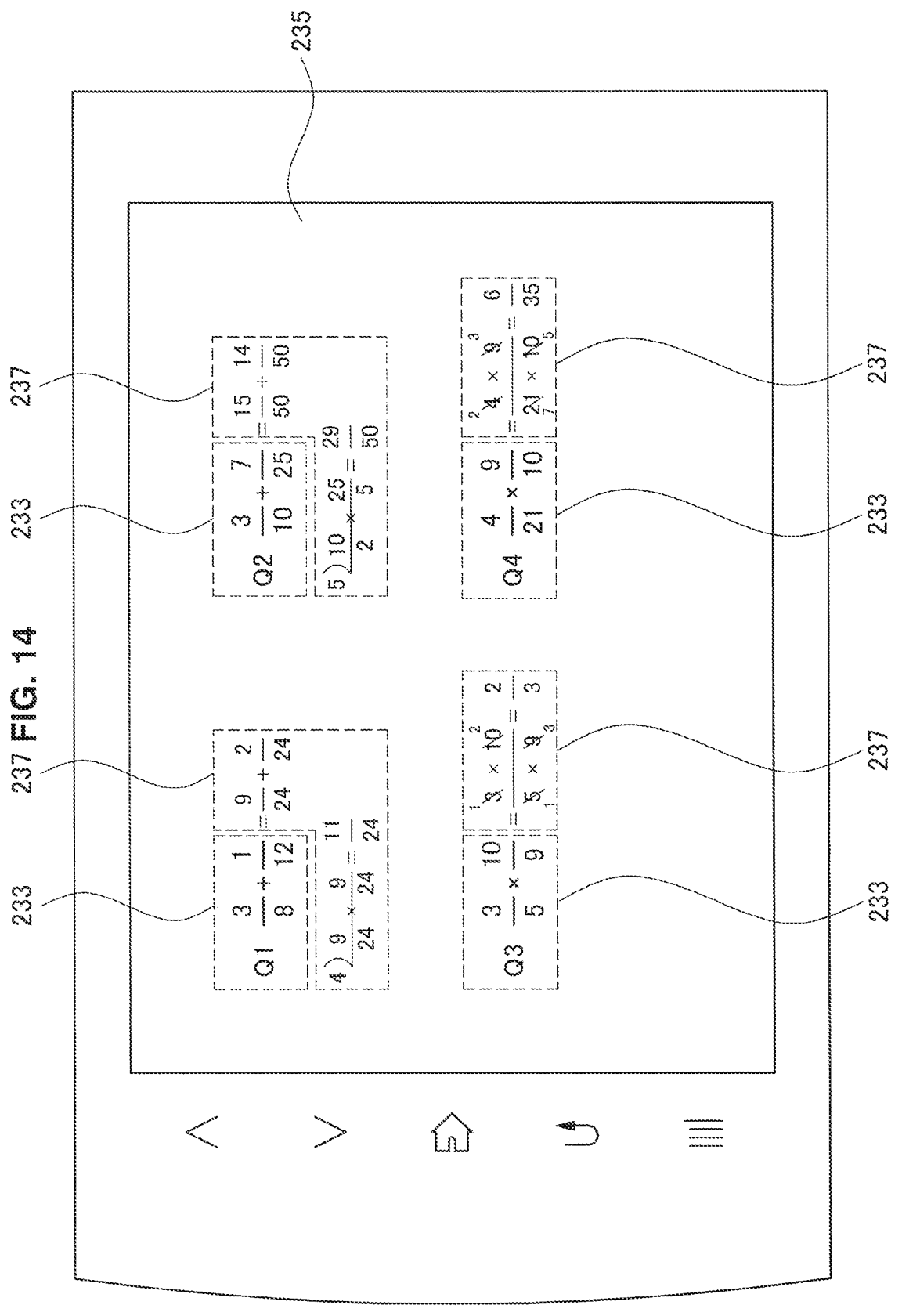

Next, a screen example 235 shown in FIG. 14 is a screen example in the case where the answerer has input answers 237 to the questions 233 in FIG. 13. In this case, for example, the editing information is the answers 237 to the questions 233, and areas linked to the answers 237 are answer boxes of the questions 233.

Figure 15:
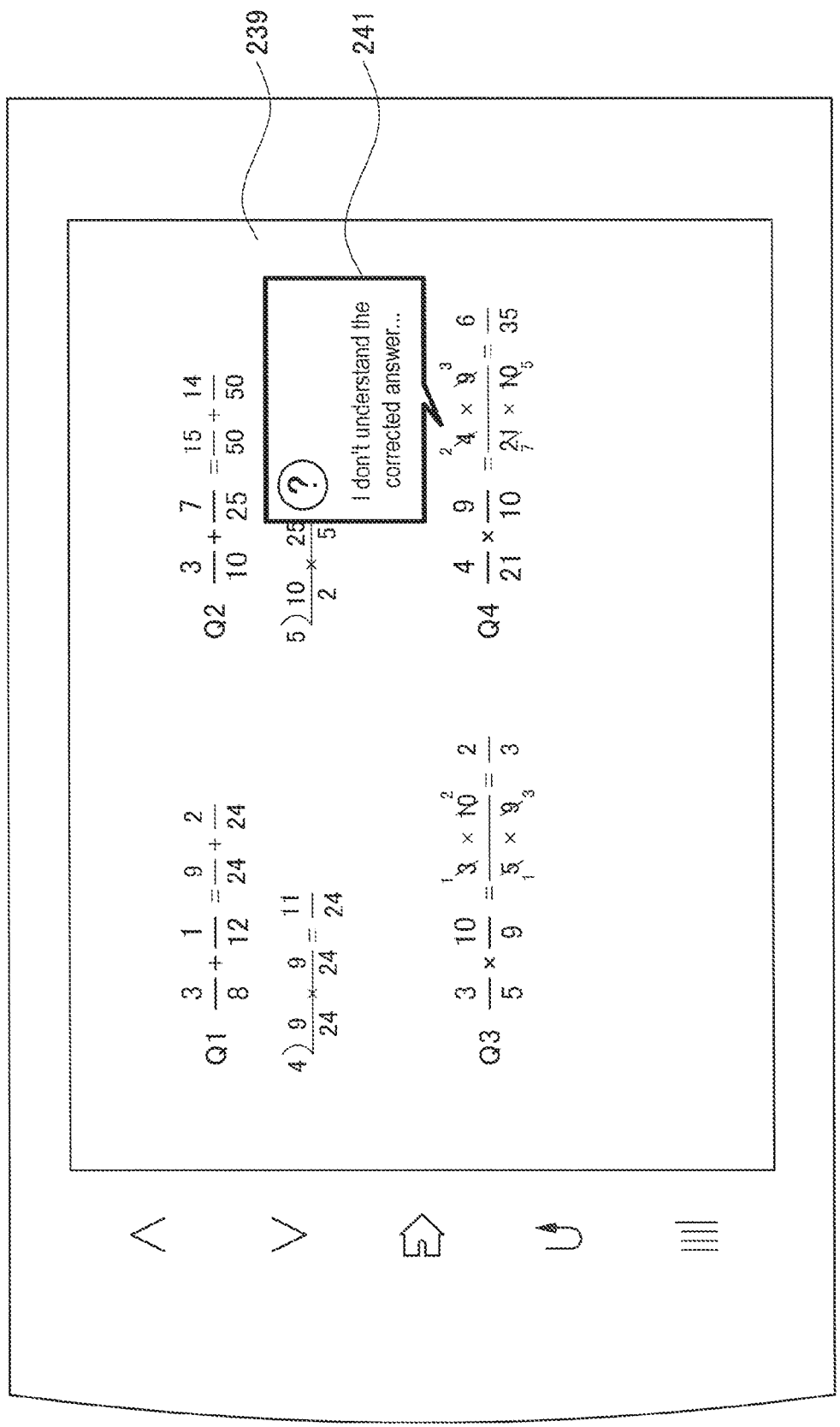
FIG. 15 is an explanatory diagram showing an example of the screen generated by the information processing device according to the first embodiment in the second application example.

Next, a screen example 239 shown in FIG. 15 is a screen example in the case where the answerer has input answers 237 and added an inquiry comment to the questions 233 in FIG. 14. Specifically, the answerer has added an inquiry comment 241 "I don't understand the corrected answer . . . " as the additional information to Q4. In this case, the additional information is the inquiry comment 241, and an area linked to the inquiry comment 241 is Q4.

Figure 16:
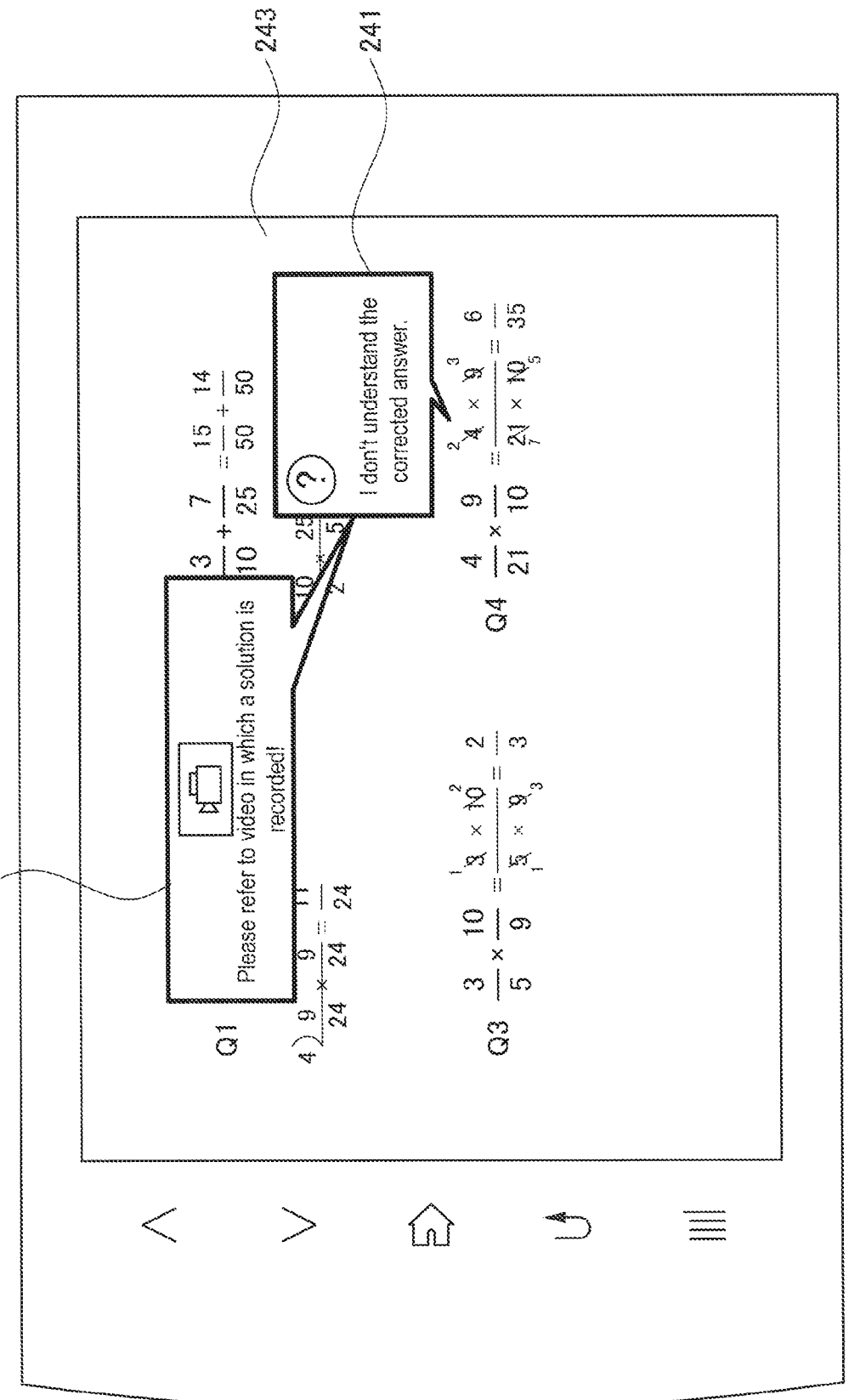
FIG. 16 is an explanatory diagram showing an example of the screen generated by the information processing device according to the first embodiment in the second application example.

A screen example 243 shown in FIG. 16 is a screen example in the case where a corrector has added a guidance comment 245 to the inquiry comment 241 after the answerer has input the answer 237 and the inquiry comment 241 to the question 233 in FIG. 15. Specifically, the corrector has added a text "Please refer to video in which a solution is recorded!" and the video as the guidance comment 245 to the inquiry comment 241 "I don't understand the corrected answer . . . ". In this case, the additional information is the guidance comment 245 including the text and the video, and additional information linked to the guidance comment 245 is the inquiry comment 241.

Figure 17:
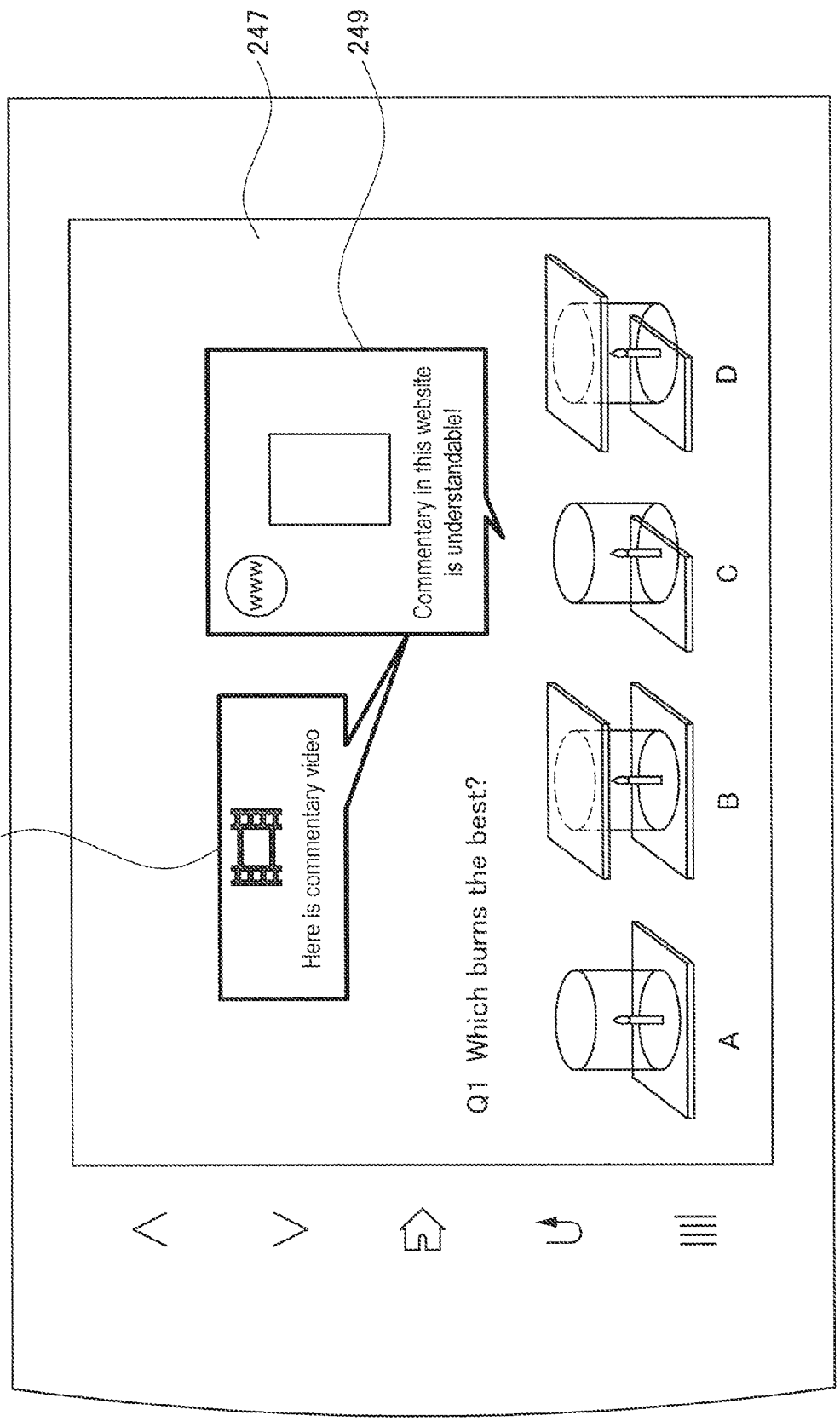
FIG. 17 is an explanatory diagram showing an example of the screen generated by the information processing device according to the first embodiment in the second application example.

A screen example 247 shown in FIG. 17 is a screen example in the case where comments 249 and 251 in which a link and the like are embedded as additional information have been added. Specifically, the information processing device 100 may embed a link to a web page or video-sharing website including a solution to the question, a question similar to the question, or the like, in the additional information. In addition, the information processing device 100 may activate a web browser or the like to display the corresponding web page or video-sharing website in the case where the user has selected the link.

3. SECOND EMBODIMENT

The following describes an information processing device 120 according to a second embodiment of the present disclosure with reference to FIGS. 18 to 22. The information processing device 120 according to the second embodiment of the present disclosure can change the layout of electronic book content including a comment or the like added by a user.

Here, according to the technology disclosed in Patent Literature 1, readers are capable of adding comments by loading entire pages of magazines serving as the electronic book content as images and designating coordinates on the images. However, according to the technology disclosed in Patent Literature 1, the user cannot change the layout of electronic book content to which the comments or the like have been added since the entire pages have been loaded as the images.

Accordingly, an information processing device by which a user can add a comment and the like to images and generate a screen whose layout can be changed while maintaining arrangement of the comment and the image to which the comment has been added is being desired. By using the information processing device 120 according to the second embodiment of the present disclosure, it is possible for the user to add a comment and the like to images and generate a screen whose layout has been changed while maintaining arrangement of the comment and the image to which the comment has been added.

[3.1. Internal Configuration of Information Processing Device]

Figure 18:
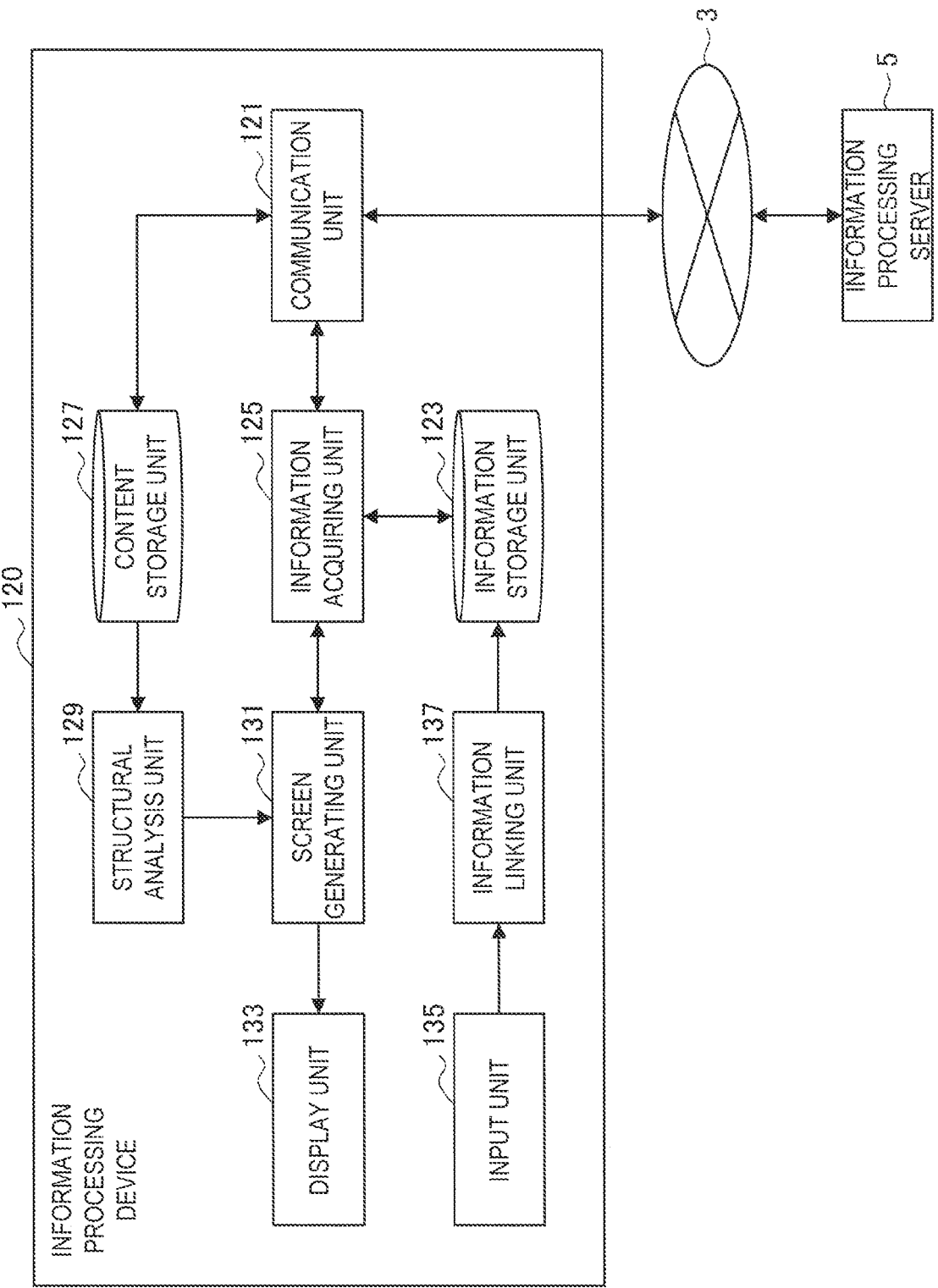
FIG. 18 is a block diagram showing an internal configuration of an information processing device according to a second embodiment.

First, with reference to FIG. 18, an internal configuration of the information processing device 120 according to the second embodiment of the present disclosure is described. FIG. 18 is a block diagram showing the internal configuration of the information processing device 120 according to the second embodiment of the present disclosure.

As shown in FIG. 18, the information processing device 120 according to the second embodiment of the present disclosure includes a communication unit 121, an information storage unit 123, an information acquiring unit 125, a content storage unit 127, a structural analysis unit 129, a screen generating unit 131, a display unit 133, an input unit 135, and an information linking unit 137. In addition, the information processing device 120 is connected to the information processing server 5 via the public network 3.

The public network 3 and the information processing server 5 are substantially the same as the configurations of those described with reference to FIG. 1. In addition, the communication unit 121 is substantially the same as the communication unit 101 in the first embodiment described with reference to FIG. 2, the content storage unit 127 is substantially the same as the content storage unit 107, the structural analysis unit 129 is substantially the same as the structural analysis unit 109, the display unit 133 is substantially the same as the display unit 113, and the input unit 135 is substantially the same as the input unit 115. Accordingly, redundant description of these structural elements is omitted.

The following describes the information storage unit 123, the information acquiring unit 125, the screen generating unit 131, and the information linking unit 137 that are characteristics in the second embodiment.

The information storage unit 123 stores additional information, and position information of a position of an image linked to the additional information and a position on the image. Specifically, the information storage unit 123 stores additional information, and position information representing a position of an image linked to the additional information and a position on the image by using a sentence structure of the electronic book content, in addition to a link between them.

The position information representing the position by using the sentence structure of the electronic book content is position information using relative coordinates on the image and the structure of the main body of the electronic book content represented by chapters, sections, paragraphs, sentences, and the like. In this way, the information storage unit 123 stores the position of the image linked to the additional information by using the position information designating the position by a chapter, section, paragraph, sentence, and the like. In addition, the information storage unit 123 stores the position on the image by using the position information represented by the relative coordinates whose origin is a predetermined reference point such as upper left corner of the image.

According to such a configuration, the information processing device 120 can generate a screen in which display at a designated position on the image linked to additional information, and the additional information are arranged in association with each other, even if the layout of the electronic book content has been changed and the position of the image has been changed. As such a position designation method using a sentence structure of electronic book content, CFI of EPUB 3 or the like designed by International Digital Publishing Forum may be used, for example.

The information acquiring unit 125 acquires additional information, and position information of a position of an image linked to the additional information and a position on the image. Specifically, the information acquiring unit 125 acquires additional information, and position information representing a position of an image linked to the additional information and a position on the image by using a sentence structure of the electronic book content, from the information storage unit 123 or the information processing server 5. Note that, as described about the information acquiring unit 105 in the first embodiment, the information acquiring unit 125 may acquire such information from any of the information storage unit 123 and the information processing server 5.

The screen generating unit 131 generates a screen displaying the electronic book content and the additional information. Specifically, the screen generating unit 131 specifies a position of an image linked to the additional information and a position on the image, on the basis of position information linked to the additional information acquired by the information acquiring unit 125, and sentence structure of the electronic book content analyzed by the structural analysis unit 129. Next, the screen generating unit 131 generates a screen displaying the additional information and the display at a position on the image linked to the additional information in association with each other, in the electronic book content. In this way, the screen generating unit 131 is capable of adding additional information to a specific position of the image in the electronic book content, and changing a layout while maintaining arrangement of the image and the additional information.

The screen generating unit 131 may generate a screen in which display of the image linked to the additional information is emphasized by a highlighter or the like. According to this configuration, the screen generating unit 131 can generate a screen displaying the image linked to the additional information to a user in an understandable way.

Alternatively, the screen generating unit 131 may generate a screen in which the display of the area linked to the additional information has been changed on the basis of the linked editing information or additional information.

Specifically, the screen generating unit 131 may generate a screen that does not display all pieces of additional information with regard to an image linked to the plurality of pieces of additional information, but displays a piece of the linked additional information as representative additional information. According to this configuration, the screen generating unit 131 can notify the user that the plurality of pieces of additional information are linked in the electronic book content, without lowering the visibility of the electronic book content in the case of displaying the image linked to the plurality of pieces of additional information.

Alternatively, the screen generating unit 131 may generate a screen in which an effect has been added on the image linked to the additional information on the basis of the number of pieces of the linked additional information. According to this configuration, the screen generating unit 131 can emphasize the image linked to many pieces of the additional information to the user. Note that, the screen generating unit 131 may determines whether or not to add the effect to the area in the electronic book content, by considering whether or not the number of pieces of the additional information linked to the area is greater than or equal to a threshold, for example. Alternatively, whether or not to add the effect may be determined by considering whether or not the number of pieces of linked additional information is greater than or equal to an average of the number of pieces of additional information in images linked to additional information. Alternatively, whether or not to add the effect may be determined by considering whether or not the additional information greater than or equal to the threshold is linked within a predetermined time.

Note that, details of the screen generated by the screen generating unit 131 are described in [3.3 Application Example of Information Processing Device].

The information linking unit 137 links the additional information, the position of the image to which the additional information is added, and the position on the image, on the basis of the user input. Specifically, the information linking unit 137 acquires additional information from the input unit 135, and links the additional information, the position of the image to which the additional information is added, and the position on the image. For example, the information linking unit 137 may designate the position information indicating the position of the image linked to the additional information and the position on the image by representation using a sentence structure of the electronic book content such as CFI. Note that, the information linking unit 137 may link a piece of additional information to another piece of additional information on the basis of user input.

As described above, the information processing device 120 according to the second embodiment of the present disclosure is capable of generating a screen displaying additional information such as a comment added by a user to a specific position on an image and display of a position on the image linked to the additional information by arranging them in association with each other. In addition, the information processing device 120 is capable of maintaining the arrangement of the additional information and the display of the position on the image linked to the additional information, even when the layout of the screen is changed.

[3.2. Operation of Information Processing Device]

Figure 19:
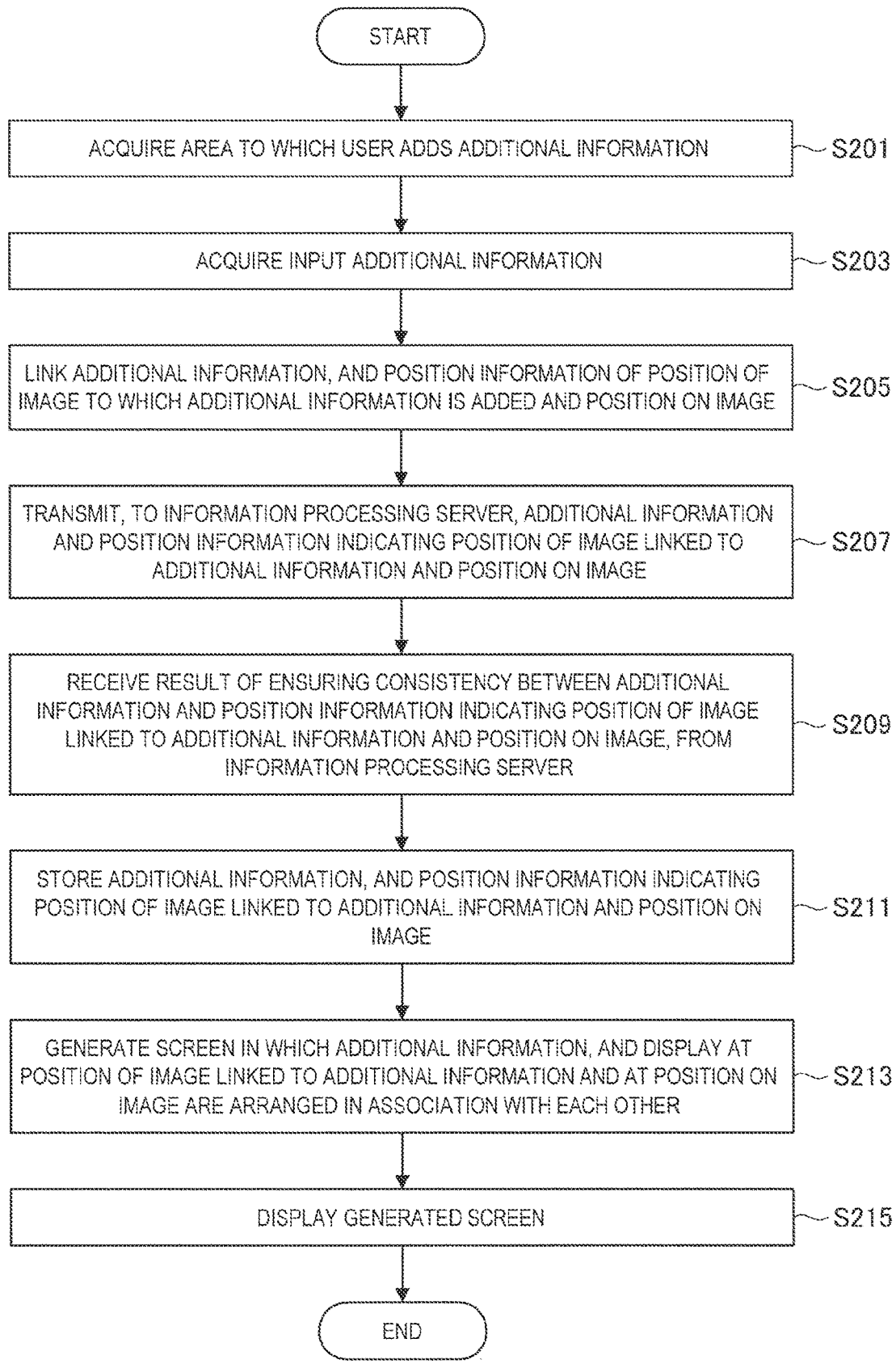
FIG. 19 is a flowchart illustrating an operation of the information processing device according to the second embodiment.

Next, with reference to FIG. 19, an operation of the information processing device 120 according to the second embodiment of the present disclosure is described. FIG. 19 is a flowchart illustrating an operation of the information processing device 120 according to the second embodiment of the present disclosure.

As shown in FIG. 19, first, the information linking unit 137 of the information processing device 120 acquires a position of an image to which a user adds additional information, and a position on the image from the input unit 135 (S201). In addition, the information linking unit 137 acquires the additional information input in the input unit 135 (S203). Subsequently, the information linking unit 137 links the acquired additional information, and position information of the position of the image to which the additional information is added and the position on the image (S205).

Next, the communication unit 121 transmits, to the information processing server 5, the additional information linked by the information linking unit 137, and the position information indicating the position of the image linked to the additional information and the position on the image (S207). Here, the information processing server 5 ensures consistency between the additional information, and the position information indicating the position of the image linked to the additional information and the position on the image that have been received from the information processing device 120, and additional information received from another information processing device (not shown). Subsequently, after ensuring their consistency, the communication unit 121 receives the additional information, and position information indicating the position of the image linked to the additional information and the position on the image, from the information processing server 5 (S209).

Note that, the additional information received in S209 may include additional information added to the electronic book content in another information processing device. In addition, the position information indicating the position of the image linked to the additional information and the position on the image, which has been received in S209, may include position information indicating a position of an image linked to the additional information and a position on the image in the another information processing device.

Next, the information acquiring unit 125 causes the information storage unit 123 to store the additional information, and the position information indicating the position of the image linked to the additional information and the position on the image that have been received by the communication unit 121 from the information processing server 5 (S211). The screen generating unit 131 generates a screen in which the additional information, and display at the position of the image linked to the additional information and at the position on the image are arranged in association with each other (S213). Subsequently, the display unit 133 displays the screen generated by the screen generating unit 131 (S215).

According to the above described operation, the information processing device 120 is capable of generating a screen displaying additional information such as a comment added by a user to a specific position on an image and display of a position on the image linked to the additional information by arranging them in association with each other.

[3.3. Application Example of Information Processing Device]

Figure 20:
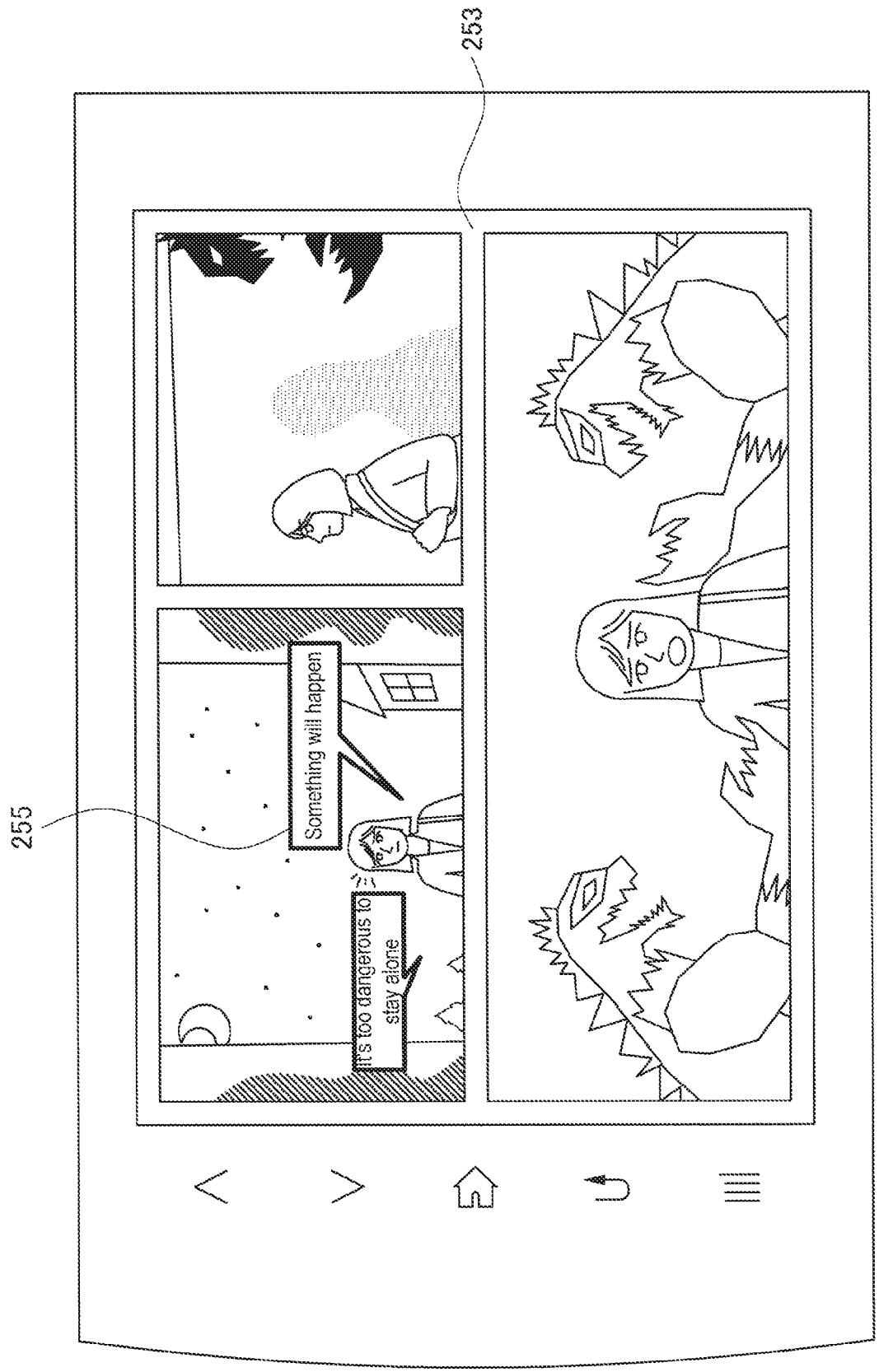
FIG. 20 is an explanatory diagram showing an example of a screen generated by the information processing device according to the second embodiment.
Figure 21:
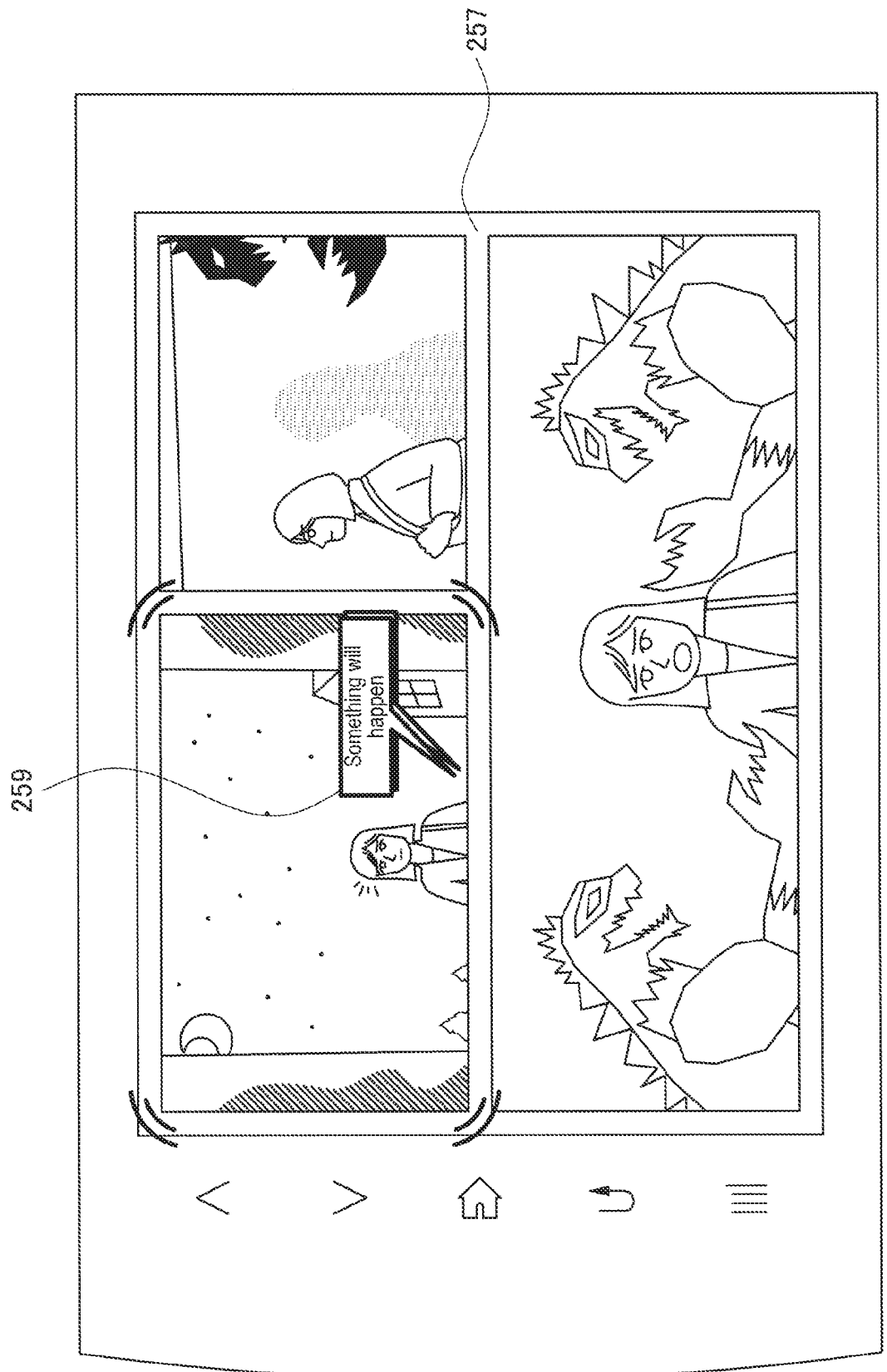
FIG. 21 is an explanatory diagram showing an example of the screen generated by the information processing device according to the second embodiment.
Figure 22:
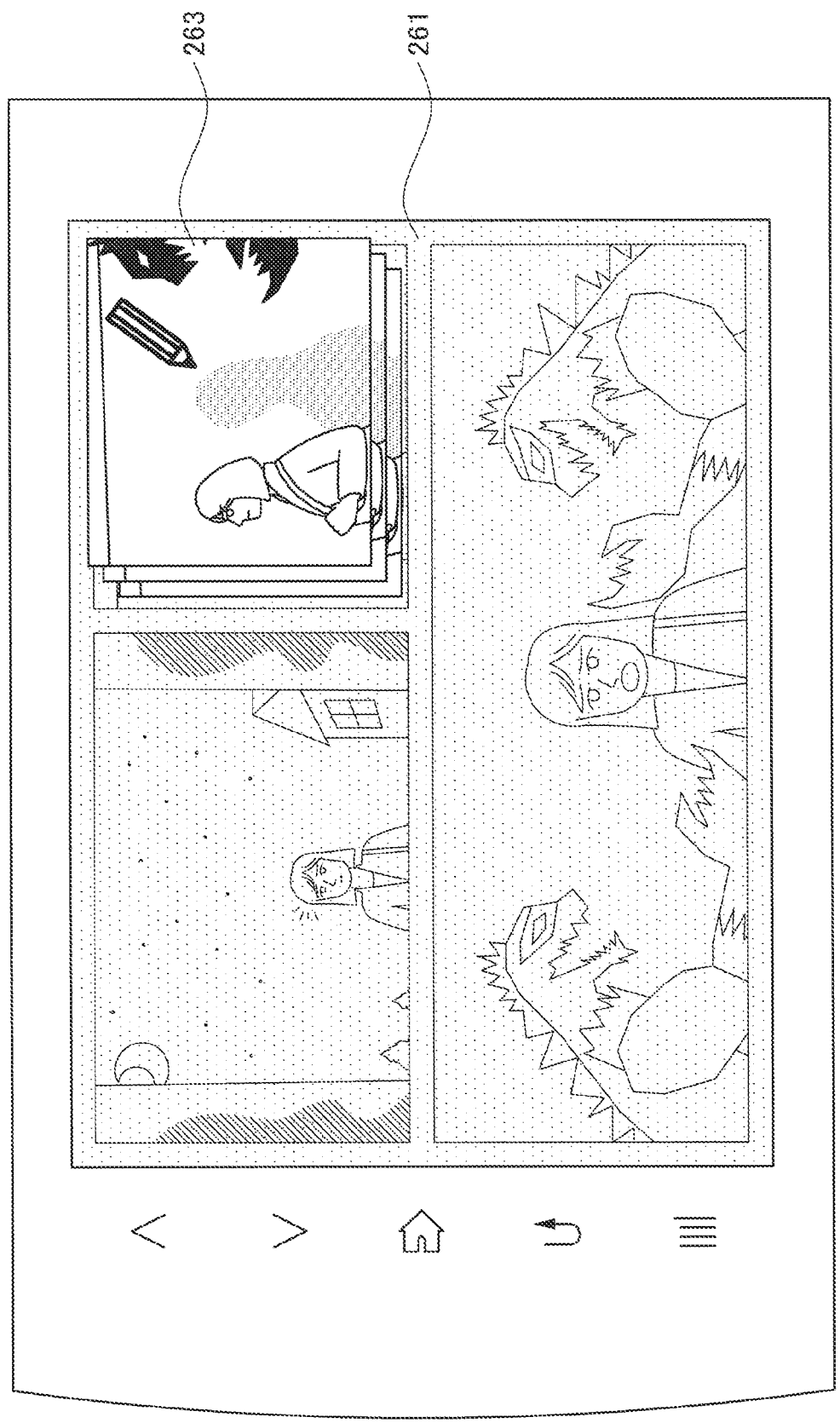
FIG. 22 is an explanatory diagram showing an example of the screen generated by the information processing device according to the second embodiment.

Next, with reference to FIGS. 20 to 22, an application example of the information processing device 120 according to the second embodiment of the present disclosure is described. FIGS. 20 to 22 are each an explanatory diagram showing an example of the screen generated by the information processing device 120 according to the second embodiment of the present disclosure. In this application example, electronic book content displayed by the information processing device 120 is a comic book, for example.

A screen example 253 shown in FIG. 20 is a screen example in the case where additional information is linked to a specific position in a first panel 255. Specifically, additional information of a text "It's too dangerous to stay alone" and a text "Something will happen" is linked to a position of a lady displayed in the first panel 255. With regard to the additional information, the texts are displayed in speech balloons from the position in which the lady is displayed. The position in which the lady is displayed and the additional information are arranged in association with each other.

Next, a screen example 257 shown in FIG. 21 is a screen example in the case where a plurality of pieces of additional information are added and linked to a first panel 259. Specifically, the plurality of pieces of additional information are linked to the first panel 259. The piece of additional information of the text "Something will happen" is displayed at a lower right side as representative additional information from among the plurality of pieces of additional information.

In this case, the information processing device 120 may display a piece of the linked additional information (the additional information of the text "Something will happen" in FIG. 21) as representative additional information at a predetermined position on the linked image, without displaying all pieces of the linked additional information. In this case, the piece of additional information displayed as the representative additional information is, for example, a piece of additional information to which the most pieces of additional information are linked.

In addition, for example, the information processing device 120 may add an effect to shake a panel to the first panel 259, on the basis of the number of pieces of linked additional information. For example, in the case where the number of pieces of linked additional information is greater than or equal to a threshold, the information processing device 120 may add the effect to the first panel 259. In the case where the number of pieces of linked additional information is greater than or equal to an average of the number of pieces of additional information in images linked to additional information, the information processing device 120 may add the effect to the first panel 259. Alternatively, in the case where the additional information greater than or equal to the threshold is linked within a predetermined time, the information processing device 120 may add the effect to the first panel 259. As an effect other than the above described effects, for example, an effect such as causing the panel to blink, enlarging and reducing the panel, or highlighting display of the panel may be added. Alternatively, as an effect, a line width, color, and the like of the frame of the panel may be changed.

For example, in the case where the user has selected representative additional information displayed in the lower right side of the first panel 259, the information processing device 120 may generate a screen displaying all pieces of additional information linked to the first panel 259. In this case, the information processing device 120 may brighten display of the first panel 259 and the pieces of additional information linked to the first panel 259, and darken display of additional information linked to the other areas and the other electronic book content.

A screen example 261 shown in FIG. 22 is a screen example in the case where a flip book of images obtained by editing a second panel 263 is linked as additional information to the second panel 263. For example, in the case where a user has selected addition of the flip book of images obtained by editing the second panel 263 as the additional information, display of the selected second panel 263 is brightened, and display of the other panels is darkened. Here, the user may generate a first frame of the flip book by editing the brightened second panel 263, and generate a second frame and a third frame by editing the second panel 263 in a similar way, so as to add the edited images as the additional information to the second panel 263. Alternatively, it is also possible for the user to add only one image obtained by editing the second panel 263 as additional information to the second panel 263, without generating the flip book of the plurality of edited images.

4. THIRD EMBODIMENT

Figure 23:
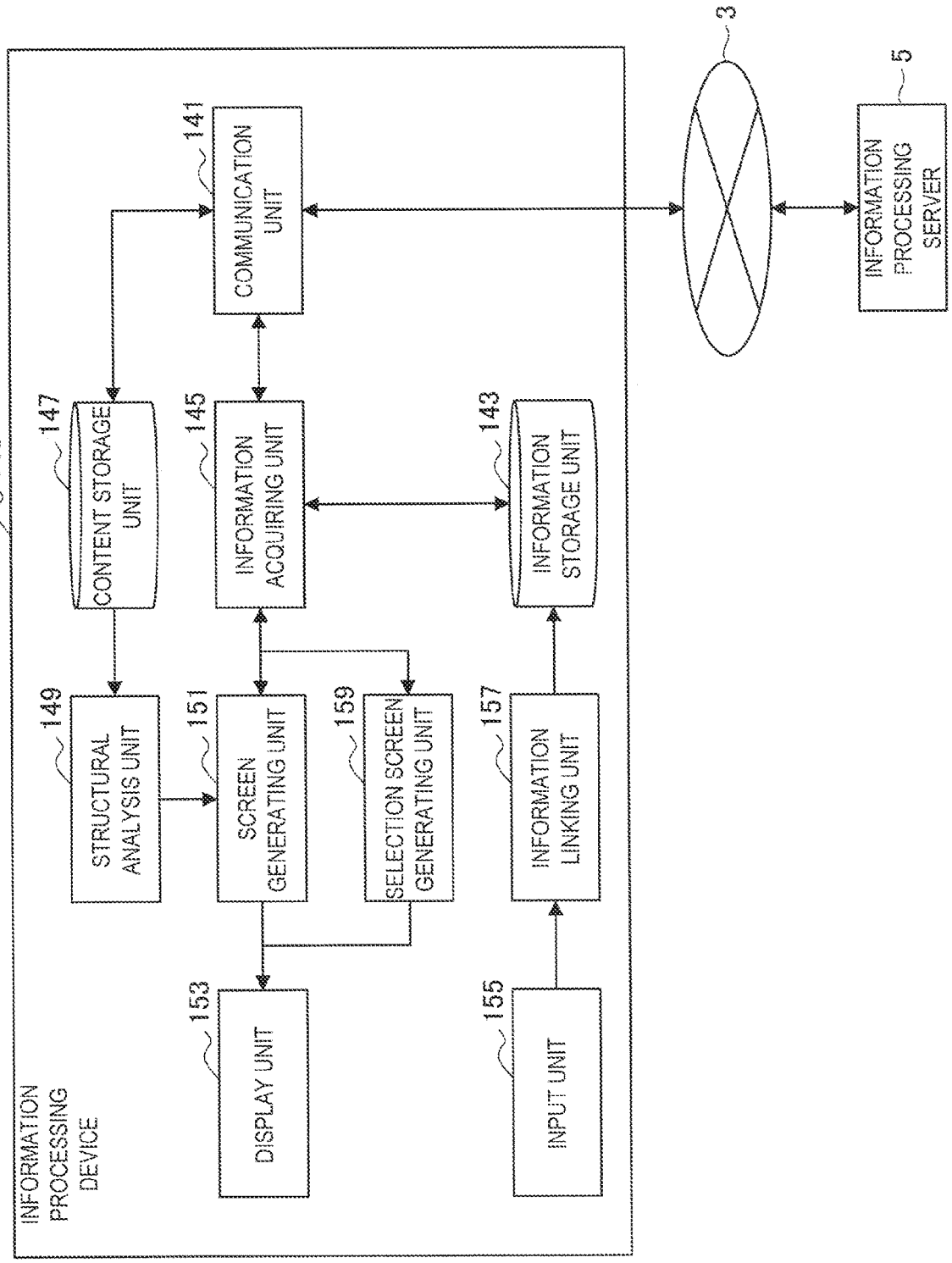
FIG. 23 is a block diagram showing an internal configuration of an information processing device according to a third embodiment.
Figure 24:
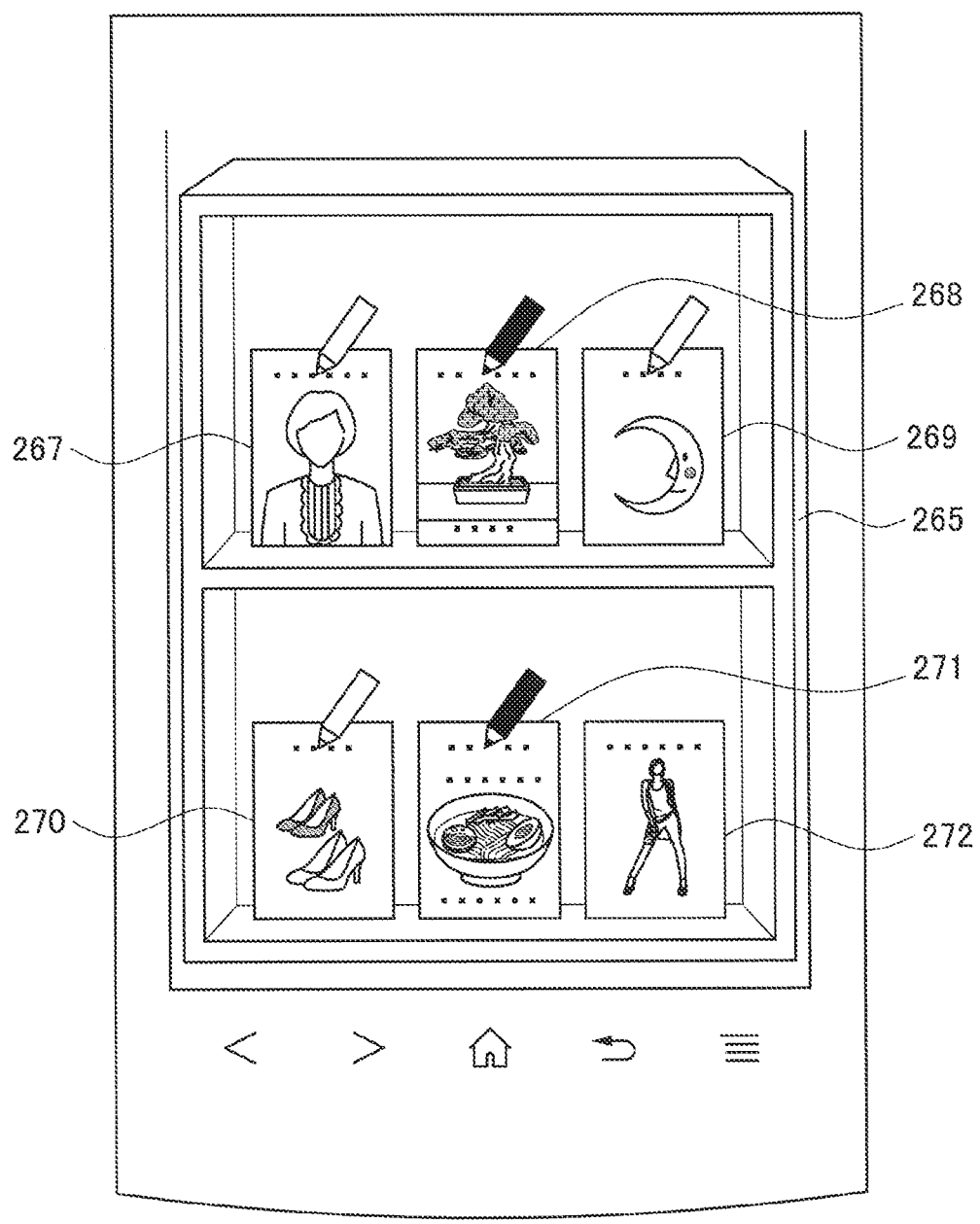
FIG. 24 is an explanatory diagram showing an example of a selection screen generated by the information processing device according to the third embodiment.
Figure 25:
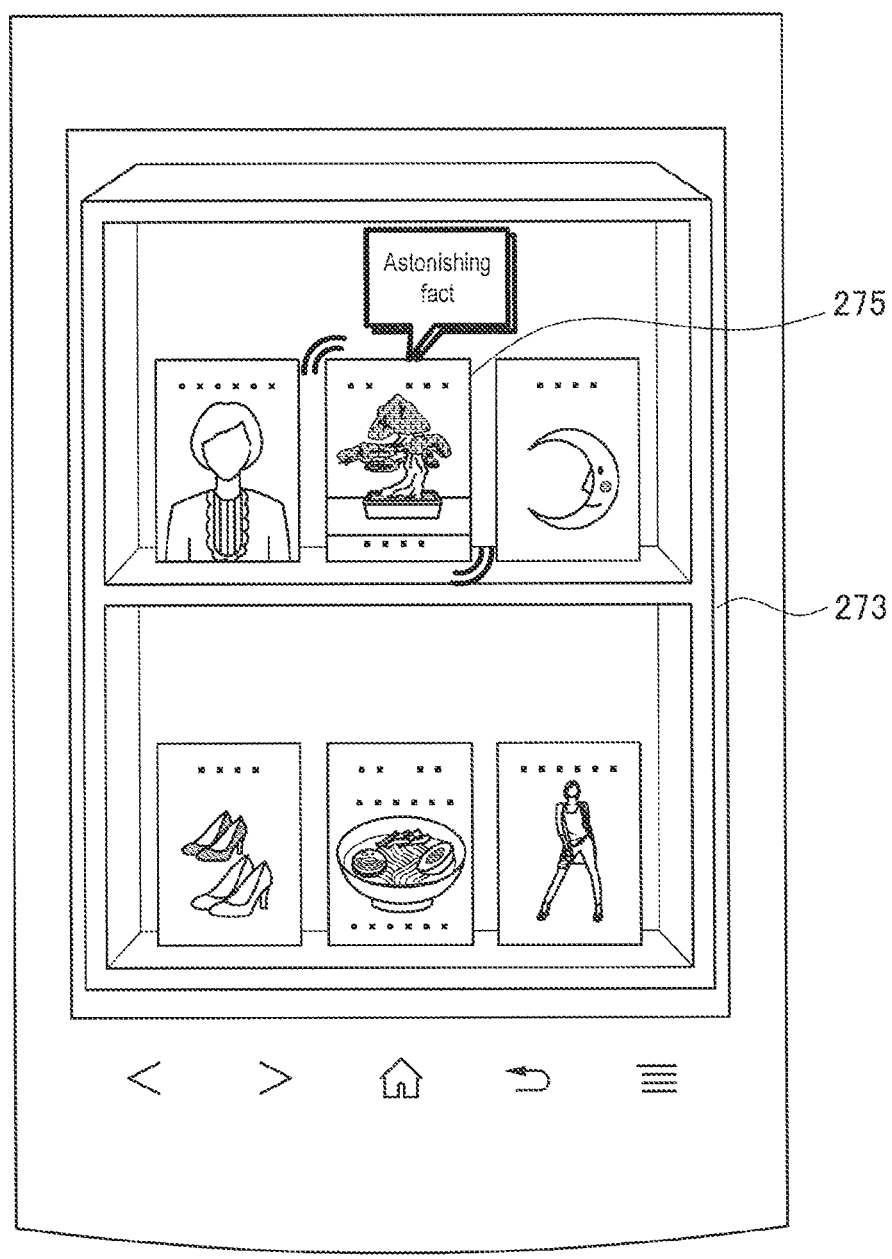
FIG. 25 is an explanatory diagram showing an example of the selection screen generated by the information processing device according to the third embodiment.

The following describes an information processing device 140 according to a third embodiment of the present disclosure with reference to FIGS. 23 to 25. The information processing device 140 according to the third embodiment of the present disclosure can generate a screen whose display has been changed on the basis of additional information and editing information linked to the electronic book content, in a selection screen of the electronic book content. Note that, it is also possible to combine the third embodiment with the first embodiment or the second embodiment.

[4.1. Internal Configuration of Information Processing Device]

First, with reference to FIG. 23, an internal configuration of the information processing device 140 according to the third embodiment of the present disclosure is described. FIG. 23 is a block diagram showing the internal configuration of the information processing device 140 according to the third embodiment of the present disclosure.

As shown in FIG. 23, the information processing device 140 according to the third embodiment of the present disclosure includes a communication unit 141, an information storage unit 143, an information acquiring unit 145, a content storage unit 147, a structural analysis unit 149, a screen generating unit 151, a display unit 153, an input unit 155, an information linking unit 157, and a selection screen generating unit 159. In addition, the information processing device 140 is connected to the information processing server 5 via the public network 3.

The public network 3 and the information processing server 5 are substantially the same as the configurations of those described with reference to FIG. 1. In addition, the communication unit 141 is substantially the same as the communication unit 101 in the first embodiment described with reference to FIG. 2, the information storage unit 143 is substantially the same as the information storage unit 103, the information acquiring unit 145 is substantially the same as the information acquiring unit 105, the content storage unit 147 is substantially the same as the content storage unit 107, the structural analysis unit 149 is substantially the same as the structural analysis unit 109, the screen generating unit 151 is substantially the same as the screen generating unit 111, the display unit 153 is substantially the same as the display unit 113, the input unit 155 is substantially the same as the input unit 115, and the information linking unit 157 is substantially the same as the information linking unit 117. Accordingly, redundant description of these structural elements is omitted.

The following describes the selection screen generating unit 159 that is a characteristic in the third embodiment.

The selection screen generating unit 159 generates a screen for selecting electronic book content. Specifically, the selection screen generating unit 159 generates a selection screen in which images indicating pieces of electronic book content are arranged. In the case where a user has selected one of the arranged pieces of electronic book content, the screen generating unit 151 generates a screen displaying the selected piece of electronic book content.

The selection screen generating unit 159 may change display of the image of the electronic book content on the basis of whether or not the electronic book content is editable. This configuration is preferable since the user can recognize electronic book content which is being edited without checking all contents.

Alternatively, the selection screen generating unit 159 may generate a screen in which display of electronic book content linked to editing information and additional information has been changed on the basis of the linked editing information and additional information.

Specifically, the selection screen generating unit 159 may change display of an image indicating electronic book content on the basis of a generation history of editing information for the electronic book content. More specifically, the selection screen generating unit 159 may generate display notifying the user of update of contents of electronic book content including editing information edited after the last date and time when the user has displayed the electronic book content, for example. Alternatively, the selection screen generating unit 159 may generate display notifying the user of update of contents of electronic book content including editing information edited during a predetermined recent period. This configuration is preferable since the user can recognize whether or not there is new editing information without checking all contents.

With regard to additional information linked to electronic book content, the selection screen generating unit 159 may generate a screen displaying a piece of the linked additional information as representative additional information by arranging it in association with the electronic book content.

Alternatively, the selection screen generating unit 159 may generate a screen in which an effect has been added to display of electronic book content on the basis of the number of pieces of additional information linked to the electronic book content. According to this configuration, the selection screen generating unit 159 can emphasize the electronic book content to which many pieces of additional information is linked, to the user. Note that, whether or not the selection screen generating unit 159 adds an effect to display of electronic book content may be determined, for example, on the basis of whether or not the number of pieces of additional information linked to the electronic book content is greater than or equal to a threshold, or on the basis of whether or not additional information greater than or equal to the threshold is linked within a predetermined time.

As described above, the information processing device 140 according to the third embodiment of the present disclosure can generate a screen in which display of electronic book content has been changed on the basis of whether the electronic book content is editable, and on the basis of additional information and editing information linked to the electronic book content. According to such a configuration, the user can recognize contents of additional information and editing information linked to the electronic book content without checking all contents of the electronic book content.

[4.2. Application Example of Information Processing Device]

Next, with reference to FIGS. 24 and 25, an application example of the information processing device 140 according to the third embodiment of the present disclosure is described. FIGS. 24 and 25 are each an explanatory diagram showing an example of a selection screen generated by the information processing device 140 according to the third embodiment of the present disclosure.

A selection screen example 265 shown in FIG. 24 is a screen example in the case where display indicating electronic book content has been changed on the basis of whether or not each piece of electronic book content is editable or on the basis of editing information linked to each piece of electronic book content. Specifically, displays 267, 268, 269, 270, 271, and 272 indicating pieces of electronic book content are displayed in a selection screen example 265. The displays have been changed on the basis of whether or not each piece of electronic book content is editable or on the basis of editing information linked to each piece of electronic book content.

The pieces of electronic book content indicated by the displays 267, 268, 269, 270, and 271 are editable. Accordingly, the information processing device 140 additionally displays pencil-type icons, for example, to indicate that the pieces of electronic book content are editable. Alternatively, to indicate that the pieces of electronic book content are editable, the information processing device 140 may display each piece of electronic book content like a half-opened book, or may add display using characters, for example.

The pieces of electronic book content indicated by the displays 268 and 271 are pieces of electronic book content including editing information edited after the last date and time when the user has displayed the pieces of electronic book content, for example. Accordingly, the information processing device 140 has changed a color of pencil-type icons from a color of pencil-type icons of the displays 267, 169, and 270, so as to indicate that contents of the pieces of electronic book content have been changed. Alternatively, to indicate that contents of the pieces of electronic book content have been changed, the information processing device 140 may display characters such as "updated", or may change displays indicating the pieces of electronic book content, for example.

Next, a selection screen example 273 shown in FIG. 25 is a screen example in the case where a display indicating a piece of electronic book content has been changed on the basis of additional information linked to pieces of electronic book content. Specifically, the selection screen example 273 displays 6 displays of pieces of electronic book content, and a plurality of pieces of additional information are linked to a piece of electronic book content indicated by a display 275.

With regard to the display 275, a piece of additional information linked to the piece of electronic book content indicated by the display 275 is arranged as representative additional information (additional information of a text "Astonishing fact" in FIG. 25) in association with the piece of electronic book content. According to this configuration, the user can check representative additional information without checking contents of the piece of electronic book content indicated by the display 275. The representative additional information to be displayed may be a piece of additional information to which the most pieces of additional information are linked from among pieces of additional information linked to the piece of electronic book content indicated by the display 275.

Alternatively, an effect such as shaking the display 275 may be added to the display 275 on the basis of the number of pieces of additional information linked to the piece of electronic book content indicated by the display 275. According to such a configuration, the user can recognize the piece of electronic book content to which many pieces of additional information are linked, without checking contents of the piece of electronic book content indicated by the display 275. Note that, whether or not the selection screen generating unit 159 adds the effect to the display indicating the piece of electronic book content may be determined, for example, by considering whether or not the number of pieces of additional information linked to the piece of electronic book content is greater than or equal to a threshold. Alternatively, whether or not to add the effect may be determined by considering whether or not the additional information greater than or equal to the threshold is linked within a predetermined time. As an effect other than the above described effects, for example, an effect such as causing the display to blink, or enlarging and reducing the display may be added. Alternatively, as an effect, a line width, color, and the like of the frame of the display may be changed.

5. HARDWARE CONFIGURATION OF INFORMATION PROCESSING DEVICE ACCORDING TO EMBODIMENT OF PRESENT DISCLOSURE

Figure 26:
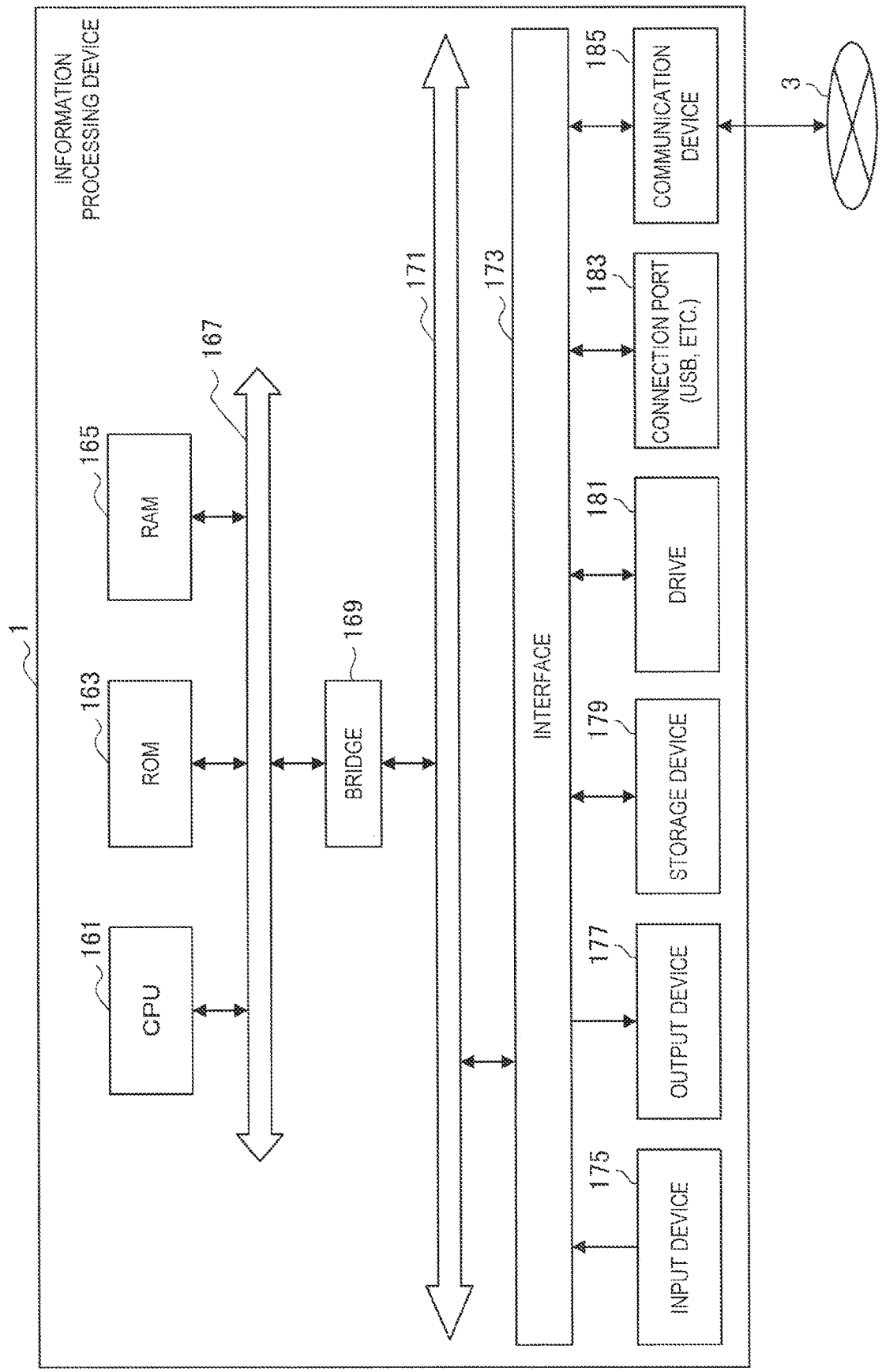
FIG. 26 is an explanatory diagram illustrating a hardware configuration of an information processing device according to an embodiment of the present disclosure.

The following describes a hardware configuration of the information processing device 1 according to the embodiment of the present disclosure with reference to FIG. 26. FIG. 26 is an explanatory diagram illustrating a hardware configuration of the information processing device 1 according to the embodiment of the present disclosure. The information processing in the information processing device 1 is achieved by operating software and hardware cooperatively.

As illustrated in FIG. 26, the information processing device 1 includes a central processing unit (CPU) 161, read only memory (ROM) 163, random access memory (RAM) 165, a bridge 169, an internal buses 167 and 171, an interface 173, an input device 175, an output device 177, a storage device 179, a drive 181, a connection port 183, and a communication device 185.

The CPU 161 functions as a processor and a control device to control all of the operating processes in the information processing device 1 in accordance with various kinds of programs. The ROM 163 stores programs and arithmetic parameters used by the CPU 161. The RAM 165 transiently stores programs used when the CPU 161 is executed, various parameters that change as appropriate when executing such programs, and the like. The CPU 161 executes functions of the information acquiring units 105, 125, and 145, functions of the structural analysis units 109, 129, and 149, functions of the screen generating units 111, 131, and 151, functions of the information linking units 117, 137, and 157, and a function of the selection screen generating unit 159, for example.

The CPU 161, the ROM 163, and the RAM 165 are connected to each other via the bridge 169, and the internal buses 167 and 169. Via the interface 173, the CPU 161, the ROM 163, and the RAM 165 are also connected to the input device 175, the output device 177, the storage device 179, the drive 181, the connection port 183, and the communication device 185.

The input device 175 includes: an input device used by the user for imputing information, such as a mouse, a keyboard, a button, a microphone, a switch, or a lever; an input control circuit configured to generate an input signal on the basis of user input and to output the signal to the CPU 161; and the like. The input device 175 executes functions of the input units 115, 135, and 155, for example.

The output device 177 may include display devices such as an LCD device, an OLED device, a plasma display device, a CRT display device, and a lamp. Further, the output device 177 may include audio output device such as a speaker or headphones. For example, the display device displays captured images and generated images. On the other hand, the audio output device converts audio data or the like into audio and outputs the audio. The output device 177 executes functions of the display units 113, 133, and 153, for example. Note that, the information processing device 1 according to the embodiment of the present disclosure may include the display device, or does not have to include the display device.

The storage device 179 is a device for data storage which is configured as an example of a storage unit of the information processing device 1. The storage unit 179 may include a storage medium, a storage device which stores data in the storage medium, a reader device which reads data from the storage medium, a deletion device which deletes data stored in the storage medium, and the like. The storage device 179 executes functions of the information storage units 103, 123, and 143, and functions of the content storage units 107, 127, and 147, for example.

The drive 181 is a reader/writer for the storage medium, and is incorporated in or externally attached to the information processing device 1. The drive 181 reads information stored in a removable storage medium that is mounted such as a magnetic disk, an optical disc, a magneto-optical disk, or semiconductor memory, and outputs the information to the RAM 165. The drive 181 is also capable of writing information to the removable storage medium.

The connection port 183 is a connection interface including a Universal Serial Bus (USB) port and a connection port for connecting an externally connected device such as an optical audio terminal, for example.

The communication device 185 is, for example, a communication interface including a communication device and the like for connection to a public network 3. The communication device 185 may be a wireless LAN compatible communication device, or may be a cable communication device performing cable communication in a wired manner. The communication device 185 executes functions of the communication units 101, 121, and 141, for example.

In addition, it is also possible to create a computer program for causing hardware such as CPU, ROM, and RAM, which are embedded in an information processing device 1, to execute functions equivalent to the configurations of the information processing device. Moreover, it may be possible to provide a storage medium having the computer program stored therein.

6. CONCLUSION

As described above, by using the information processing device 1 according to the embodiment of the present disclosure, it is possible to generate a screen in which electronic book content has been edited by the editing information and change the layout of the electronic book content while maintaining arrangement of an image linked to additional information. As described above, by using the information processing device 1 according to the embodiment of the present disclosure, it is possible to flexibly generate display of the electronic book content in which a content has been changed.

More specifically, by using the information processing device 100 according to the first embodiment of the present disclosure, it is possible to edit the main body of the electronic book content and generate editing information. It is also possible for the information processing device 100 to generate a screen in which an area of the electronic book content linked to the editing information has been edited by the editing information.

The information processing device 120 according to the second embodiment of the present disclosure is capable of generating a screen displaying additional information such as a comment added by a user to a specific position on an image and display of a position on the image linked to the additional information by arranging them in association with each other. In addition, the information processing device 120 is capable of maintaining the arrangement of the additional information and the display of the position on the image linked to the additional information, even when the layout of the screen has been changed.

The information processing device 140 according to the third embodiment of the present disclosure can generate a screen in which display of electronic book content has been changed on the basis of whether the electronic book content is editable, and on the basis of additional information and editing information linked to the electronic book content. According to such a configuration, the user can recognize contents of additional information and editing information linked to the electronic book content without checking all contents of the electronic book content.

Although preferred embodiments of the present disclosure have been described in detail above with reference to the appended drawings, the technical scope of the embodiments of the present disclosure is not limited to the above example. It is obvious to those with a general knowledge of the technical field of the embodiments of the present disclosure that various modifications and alterations may occur within the technical scope defined in the claims, and that these modifications and alterations are encompassed within the technical scope of the embodiments of the present disclosure.

According to the above, the information processing device 1 is a display terminal used by a user reading electronic book content. However, the technology of the present disclosure is not limited thereto. For example, the information processing device 1 may be integrated with the information processing server 5, without including the display device.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing device including:

an information acquiring unit that acquires editing information for electronic book content, and position information indicating an area linked to the editing information in the electronic book content; and a screen generating unit that generates a screen in which the area indicated by the position information has been edited using the editing information.

(2)

The information processing device according to (1), wherein the position information is represented using a sentence structure of the electronic book content.

(3)

The information processing device according to (1) or (2), wherein the electronic book content is reflowable content having a dynamic fluid layout.

(4)

The information processing device according to any one of (1) to (3), wherein the editing information is an image, and wherein the screen generating unit generates a screen including the editing information as a page next to a page including the area linked to the editing information.

(5)

The information processing device according to any one of (1) to (4), wherein the screen generating unit generates a screen in which display of an area edited using the editing information has been emphasized.

(6)

The information processing device according to any one of (1) to (5), further including an information linking unit that links the editing information to position information indicating an area edited using the editing information in the electronic book content, on the basis of user input.

(7)

The information processing device according to any one of (1) to (6), wherein the information acquiring unit further acquires additional information for the electronic book content, and position information indicating an area linked to the additional information in the electronic book content, and wherein the screen generating unit generates a screen in which display of the area indicated by the position information and the additional information are arranged in association with each other.

(8)

The information processing device according to (7), wherein the screen generating unit generates a screen in which a piece of the additional information linked to the area in the electronic book content, and display of the area are arranged in association with each other.

(9)

The information processing device according to (7) or (8), wherein the screen generating unit generates a screen in which an effect has been added to display of the area, on the basis of the number of pieces of the additional information linked to the area in the electronic book content.

(10)

The information processing device according to any one of (7) to (9), wherein a piece of the additional information is linked to another piece of additional information, and wherein the screen generating unit generates a screen in which the piece of the additional information and the another piece of additional information are arranged in association with each other.

(11)

The information processing device according to any one of (7) to (10), further including a selection screen generating unit that generates a selection screen in which an image indicating the electronic book content is arranged.

(12)

The information processing device according to (11), wherein the selection screen generating unit generates a screen in which display of the image indicating the electronic book content has been changed, on the basis of whether or not the electronic book content is editable.

(13)

The information processing device according to (12), wherein the selection screen generating unit generates a screen in which display of the image indicating the electronic book content has been changed, on the basis of a generation history of the editing information in the electronic book content.

(14)

The information processing device according to any one of (11) to (13), wherein the selection screen generating unit generates a screen in which a piece of the additional information linked to the electronic book content, and the image indicating the electronic book content are arranged in association with each other.

(15)

The information processing device according to any one of (11) to (14), wherein the selection screen generating unit generates a screen in which display of the image indicating the electronic book content has been changed, on the basis of the number of pieces of the additional information linked to the electronic book content.

(16)

An information processing method including:

acquiring editing information for electronic book content, and position information indicating an area linked to the editing information in the electronic book content; and generating, by a processor, a screen in which the area indicated by the position information has been edited using the editing information.

(17)

A program causing a computer to function as:

an information acquiring unit that acquires editing information for electronic book content, and position information indicating an area linked to the editing information in the electronic book content; and a screen generating unit that generates a screen in which the area indicated by the position information has been edited using the editing information.

(18)

An information processing device including:

an information acquiring unit that acquires additional information for electronic book content, and position information representing a position of an image linked to the additional information in the electronic book content and a position on the image by using a sentence structure of the electronic book content; and a screen generating unit that generates a screen in which display at the position on the image indicated by the position information, and the additional information are arranged in association with each other.

(19)

The information processing device according to (18), wherein the electronic book content is reflowable content having a dynamic fluid layout.

(20)

The information processing device according to (18) or (19), wherein the screen generating unit generates a screen in which a piece of the additional information linked to the image, and display on the image are arranged in association with each other.

(21)

The information processing device according to any one of (18) to (20), wherein the screen generating unit generates a screen in which an effect has been added to the image, on the basis of the number of pieces of the additional information linked to the image.

(22)

The information processing device according to any one of (18) to (21), wherein the additional information is an edited image obtained by editing the image linked to the additional information.

(23)

The information processing device according to any one of (18) to (22), further including an information linking unit that links the additional information, and position information representing a position of the image to which the additional information is added and a position on the image by using a sentence structure of the electronic book content, on the basis of user input.

(24)
An information processing method including:
acquiring additional information for electronic book content, and position information representing a position of an image linked to the additional information in the electronic book content and a position on the image by using a sentence structure of the electronic book content; and
generating, by a processor, a screen in which display of the position on the image indicated by the position information, and the additional information are arranged in association with each other.

(25)
A program causing a computer to function as:
an information acquiring unit that acquires additional information for electronic book content, and position information representing a position of an image linked to the additional information in the electronic book content and a position on the image by using a sentence structure of the electronic book content; and
a screen generating unit that generates a screen in which display of the position on the image indicated by the position information, and the additional information are arranged in association with each other.

REFERENCE SIGNS LIST 1, 100, 120, 140 information processing device
3 public network
5 information processing server
101, 121, 141 communication unit
103, 123, 143 information storage unit
105, 125, 145 information acquiring unit
107, 127, 147 content storage unit
109, 129, 149 structural analysis unit
111, 131, 151 screen generating unit
113, 133, 153 display unit
115, 135, 155 input unit
117, 137, 157 information linking unit
159 selection screen generating unit

The invention claimed is:
1. An information processing device, comprising:
a display device; and
at least one processor configured to:
acquire editing information for electronic book content;
acquire additional information for the electronic book content;
analyze a sentence structure of the electronic book content, wherein
the sentence structure indicates a structure of a main body of the electronic book content, and
the structure of the main body is represented by at least one of chapters, sections, paragraphs, or sentences in the electronic book content;
acquire first position information that indicates a first area in the electronic book content, wherein
the first area is linked to the editing information, and
the first position information is represented by the sentence structure of the electronic book content;
edit the first area based on the acquired editing information;
acquire second position information that indicates a second area in the electronic book content;
link a first piece of the additional information of a number of pieces of the additional information to the second position information based on a first user input;
link a second piece of the additional information of the number of pieces of the additional information to the first piece of the additional information based on a second user input;
install a button for reception of a user vote with regard to the second piece of the additional information;
determine the number of pieces of the additional information is greater than a threshold;
add a display effect to the second area based on:
the determination that the number of pieces of the additional information is greater than the threshold, and
a time period within which the number of pieces of the additional information are linked to the second position information;
generate a first screen in which the first area, indicated by the first position information, is edited based on the acquired editing information;
generate a second screen in which the display effect is added to the second area;
control the display device to display the generated first screen and the generated second screen;
control brightness of the second area and brightness of the number of pieces of the additional information in the displayed second screen based on a third user input, wherein the third user input corresponds to a selection of the second area on the displayed second screen;
generate a selection screen that comprises an image that indicates the electronic book content; and
change display of the image based on a generation history of the editing information in the electronic book content.

2. The information processing device according to claim 1, wherein
the editing information is an image,
the at least one processor is further configured to generate a third screen that includes the editing information as a first page, and
the first page is subsequent to a second page that includes the first area linked to the editing information.

3. The information processing device according to claim 1, wherein the at least one processor is further configured to generate a third screen in which display of the first area is emphasized.

4. The information processing device according to claim 1, wherein the at least one processor is further configured to link the editing information to the first position information based on a fourth user input.

5. The information processing device according to claim 1, wherein the at least one processor is further configured to generate a third screen in which display of the second area is arranged in association with display of the additional information.

6. The information processing device according to claim 5, wherein the at least one processor is further configured to:
link a third piece of the additional information to the second area; and
generate a fourth screen in which display of the third piece of the additional information is arranged in association with the display of the second area.

7. The information processing device according to claim 5, wherein
the at least one processor is further configured to generate a fourth screen in which the first piece of the additional information is arranged in association with the second piece of the additional information.

8. The information processing device according to claim 1, wherein the at least one processor is further configured to change display of the image based on the electronic book content that is editable.

9. The information processing device according to claim 1, wherein the at least one processor is further configured to generate a third screen in which a third piece of the additional information is arranged in association with the image that indicates the electronic book content.

10. The information processing device according to claim 1, wherein the at least one processor is further configured to change display of the image based on the number of pieces of the additional information linked to the electronic book content.

11. An information processing method, comprising:
in an information processing device comprising a display device and a processor:
acquiring, by the processor, editing information for electronic book content;
acquiring, by the processor, additional information for the electronic book content;
analyzing, by the processor, a sentence structure of the electronic book content, wherein
the sentence structure indicates a structure of a main body of the electronic book content, and
the structure of the main body is represented by at least one of chapters, sections, paragraphs, or sentences in the electronic book content;
acquiring, by the processor, first position information indicating a first area in the electronic book content, wherein
the first area is linked to the editing information, and
the first position information is represented by the sentence structure of the electronic book content;
editing, by the processor, the first area based on the acquired editing information;
acquiring, by the processor, second position information that indicates a second area in the electronic book content;
linking, by the processor, a first piece of the additional information of a number of pieces of the additional information to the second position information based on a first user input;
linking, by the processor, a second piece of the additional information of the number of pieces of the additional information to the first piece of the additional information based on a second user input;
installing, by the processor, a button for reception of a user vote with regard to the second piece of the additional information;
determining, by the processor, the number of pieces of the additional information is greater than a threshold;
adding, by the processor, a display effect to the second area based on:
the determination that the number of pieces of the additional information is greater than the threshold, and
a time period within which the number of pieces of the additional information are linked to the second position information;
generating, by the processor, a first screen in which the first area, indicated by the first position information, is edited based on the acquired editing information;
generating, by the processor, a second screen in which the display effect is added to the second area;
controlling, by the processor, the display device to display the generated first screen and the generated second screen;
controlling, by the processor, brightness of the second area and brightness of the number of pieces of the additional information in the displayed second screen based on a third user input, wherein the third user input corresponds to a selection of the second area on the displayed second screen;
generating, by the processor, a selection screen that comprises an image that indicates the electronic book content; and
changing, by the processor, display of the image based on a generation history of the editing information in the electronic book content.

12. A non-transitory computer-readable medium having stored thereon computer-readable instructions that, when executed by a processor, cause the processor to execute operations, the operations comprising:
acquiring editing information for electronic book content;
acquiring additional information for the electronic book content;
analyzing a sentence structure of the electronic book content, wherein
the sentence structure indicates a structure of a main body of the electronic book content, and
the structure of the main body is represented by at least one of chapters, sections, paragraphs, or sentences in the electronic book content;
acquiring first position information indicating a first area in the electronic book content, wherein
the first area is linked to the editing information, and
the first position information is represented by the sentence structure of the electronic book content;
editing the first area based on the acquired editing information;
acquiring second position information that indicates a second area in the electronic book content;
linking a first piece of the additional information of a number of pieces of the additional information to the second position information based on a first user input;
linking a second piece of the additional information of the number of pieces of the additional information to the first piece of the additional information based on a second user input;
installing a button for reception of a user vote with regard to the second piece of the additional information;
determining the number of pieces of the additional information is greater than a threshold;
adding a display effect to the second area based on:
the determination that the number of pieces of the additional information is greater than the threshold, and
a time period within which the number of pieces of the additional information are linked to the second position information;
generating a first screen in which the first area, indicated by the first position information, is edited based on the acquired editing information;
generating a second screen in which the display effect is added to the second area;
controlling a display device to display the generated first screen and the generated second screen;

controlling brightness of the second area and brightness of the number of pieces of the additional information in the displayed second screen based on a third user input, wherein the third user input corresponds to a selection of the second area on the displayed second screen;

generating a selection screen that comprises an image that indicates the electronic book content; and changing display of the image based on a generation history of the editing information in the electronic book content.

\* \* \* \* \*